US006768517B2

(12) United States Patent
Limberg et al.

(10) Patent No.: US 6,768,517 B2
(45) Date of Patent: Jul. 27, 2004

(54) REPETITIVE-PN1023-SEQUENCE ECHO-CANCELLATION REFERENCE SIGNAL FOR SINGLE-CARRIER DIGITAL TELEVISION BROADCAST SYSTEMS

(76) Inventors: Allen Le Roy Limberg, 2500 Lakevale Dr., Vienna, VA (US) 22181; James Douglas McDonald, 2307 S. First St. # 304, Champaign, IL (US) 61820; Chandrakant Bhailalbhai Patel, 251 Hopewell-Amwell Rd., Hopewell, NJ (US) 08525

( * ) Notice: Subject to any disclaimer, the term of this patent is extended or adjusted under 35 U.S.C. 154(b) by 380 days.

(21) Appl. No.: 09/903,079

(22) Filed: Jul. 11, 2001

(65) Prior Publication Data

US 2002/0051087 A1 May 2, 2002

Related U.S. Application Data

(60) Provisional application No. 60/241,158, filed on Oct. 18, 2000, and provisional application No. 60/217,495, filed on Jul. 11, 2000.

(51) Int. Cl.[7] .......................... H04N 5/21; H04N 5/213; H04N 5/217
(52) U.S. Cl. ...................... 348/614; 348/611; 375/342; 375/343
(58) Field of Search ................................. 348/614, 611; 375/262, 265, 341, 229, 230, 231, 232, 233, 234, 235, 236, 237, 238, 239, 350; H04N 5/21, 5/213, 5/217

(56) References Cited

U.S. PATENT DOCUMENTS

| RE31,253 E | * | 5/1983 | Weinstein ................ 179/170.2 |
| 4,578,544 A | * | 3/1986 | Colin de Verdiere et al. ....... 379/406.08 |
| 5,065,242 A | * | 11/1991 | Dieterich et al. ............ 348/614 |
| 5,592,235 A | * | 1/1997 | Park et al. .................. 348/555 |
| 5,886,748 A | * | 3/1999 | Lee ............................. 348/614 |
| 5,955,618 A | * | 9/1999 | Kim ........................... 548/471 |
| 6,229,560 B1 | * | 5/2001 | Jun ............................. 348/21 |
| 6,515,713 B1 | * | 2/2003 | Nam .......................... 348/614 |
| 6,559,894 B2 | * | 5/2003 | Omura et al. ............... 348/614 |

OTHER PUBLICATIONS

ATSC Digital Television Standard p. 55.*

* cited by examiner

Primary Examiner—Michael H. Lee
Assistant Examiner—Trang U. Tran

(57) ABSTRACT

DTV signals transmitted over the air with a symbol rate of around 10.76 million samples per second include echo-cancellation reference (ECR) signals each of which includes or essentially consists of a repetitive-PN1023 sequence with baud-rate symbols, which repetitive-PN1023 sequence incorporates a number of consecutive data-segment synchronization signals. Receivers for these DTV signals respond to these ECR signals to generate initial weighting coefficients for adaptive filters used for channel equalization and echo suppression. The initial weighting coefficients are calculated from a cepstrum extracted from the repetitive-PN1023 sequence ECR signal by DFT methods or with a PN1023 auto-correlation match filter.

25 Claims, 18 Drawing Sheets

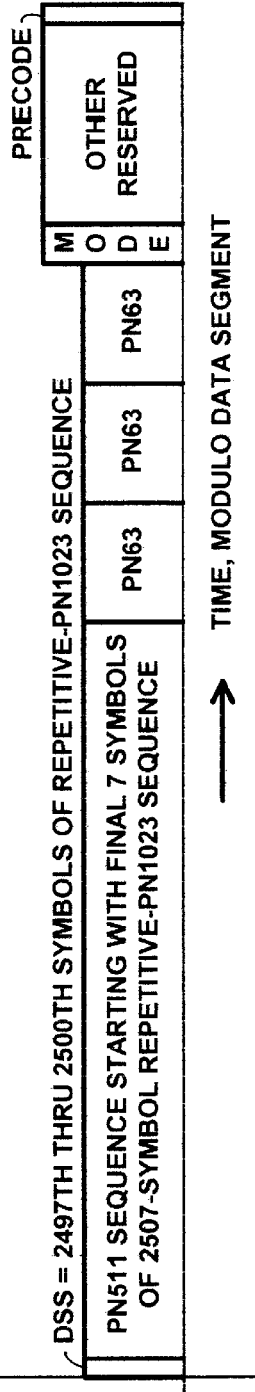

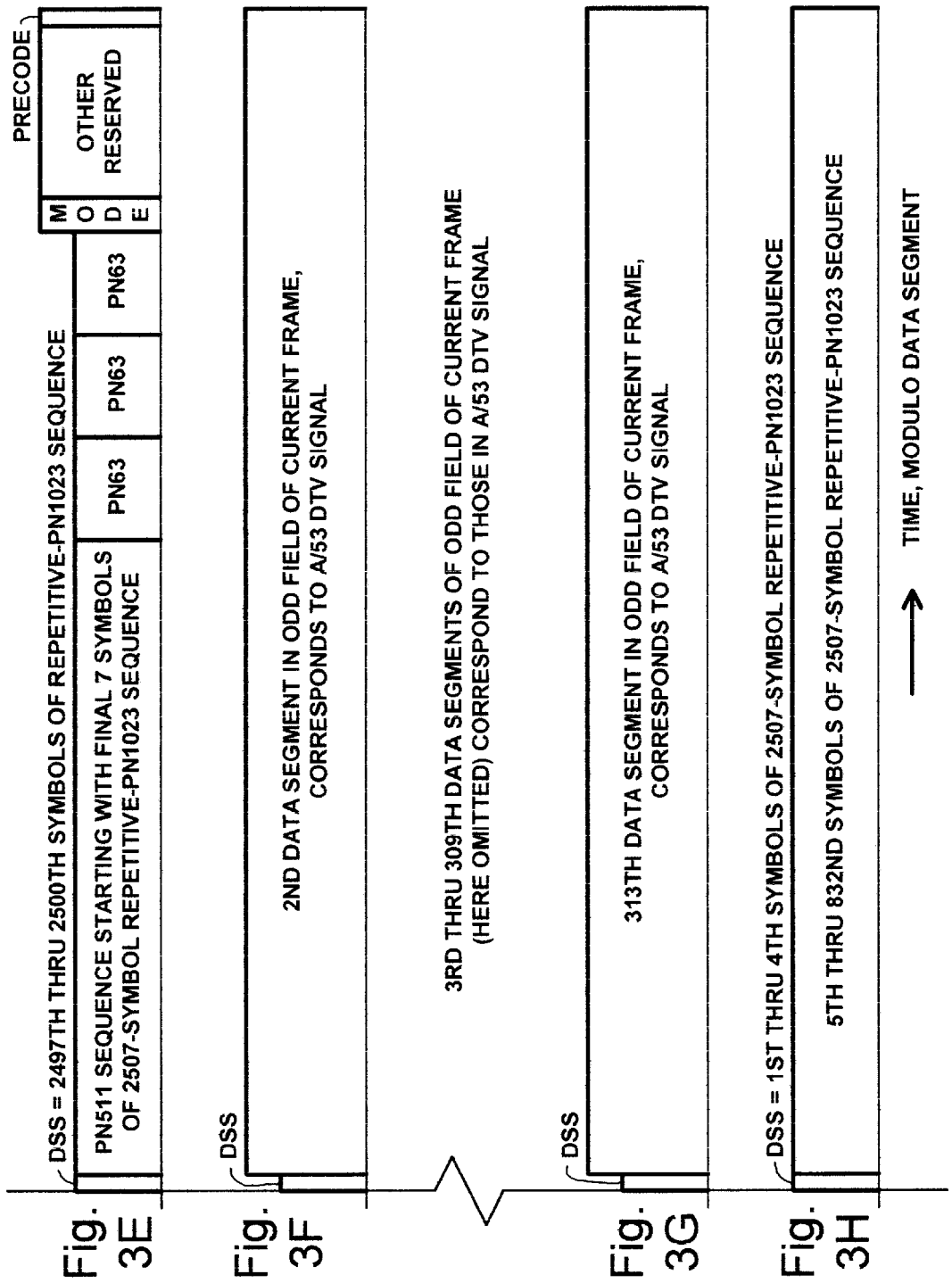

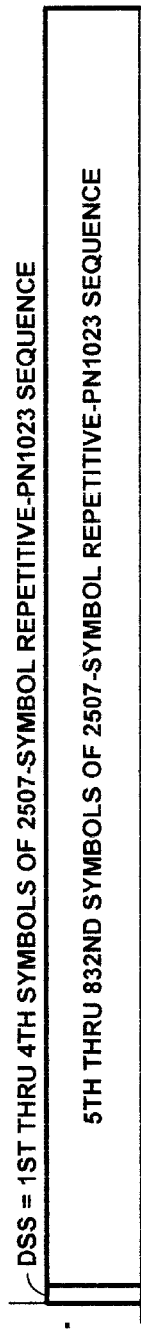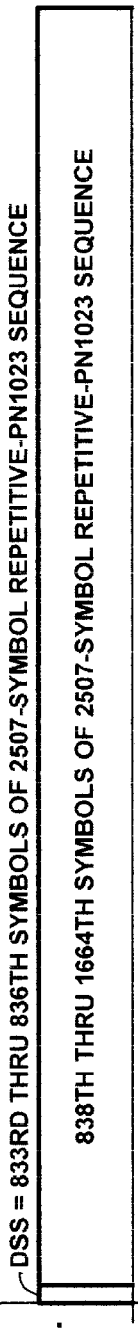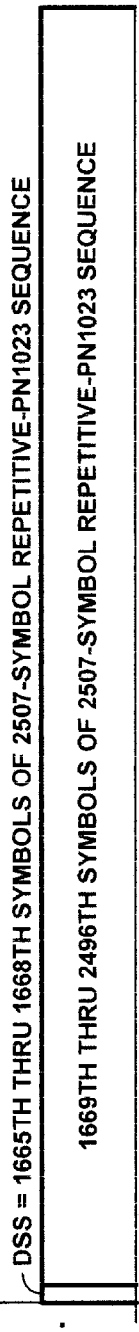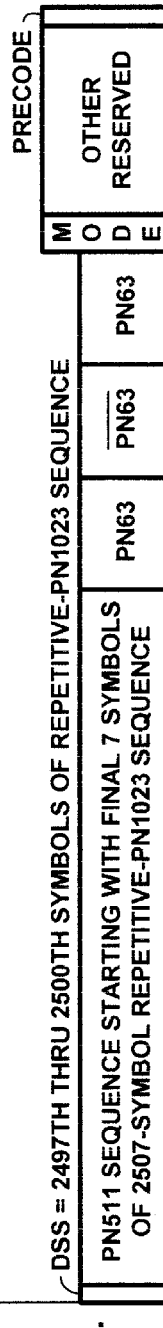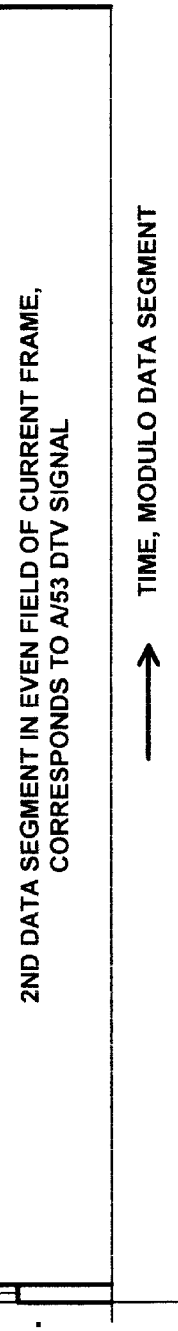

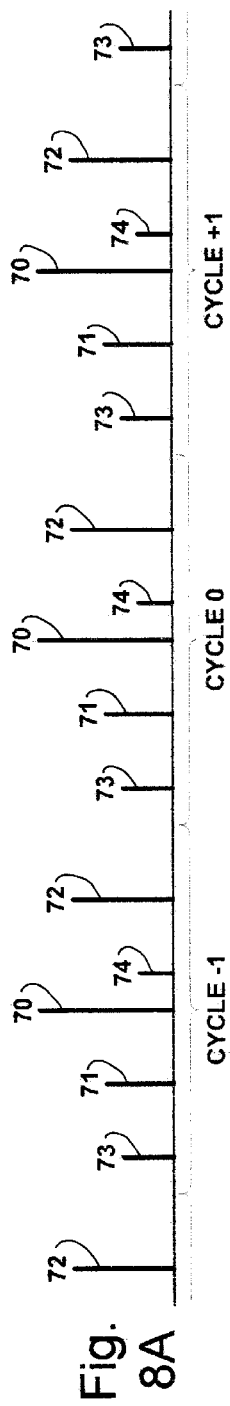
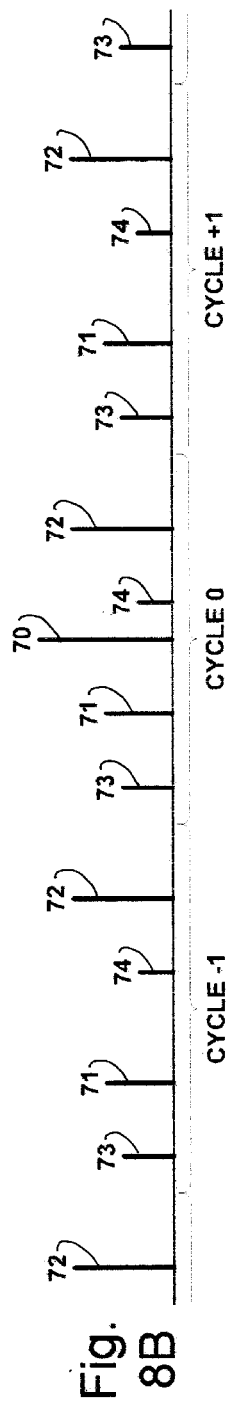
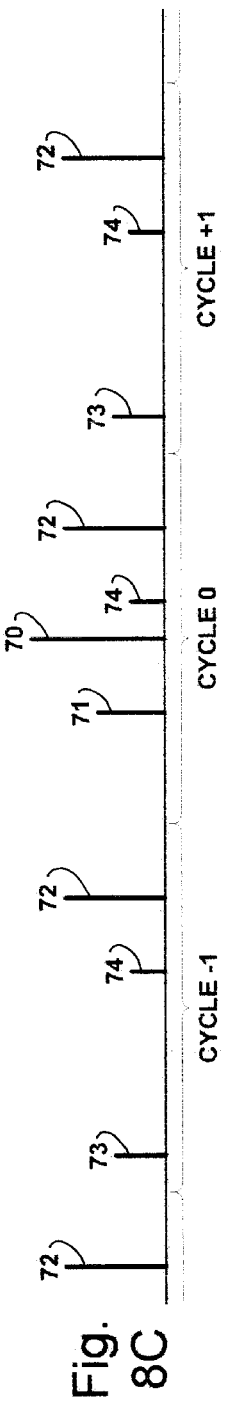
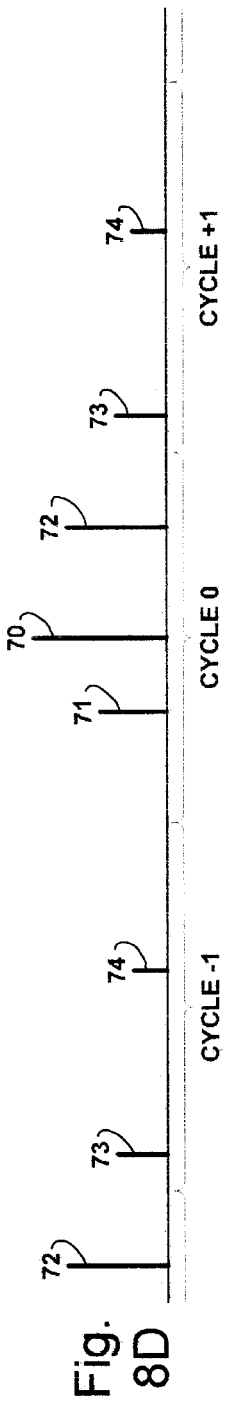
Fig. 8A
Fig. 8B
Fig. 8C
Fig. 8D

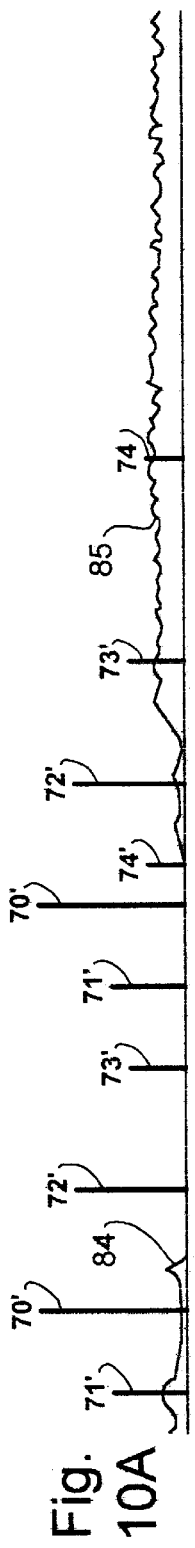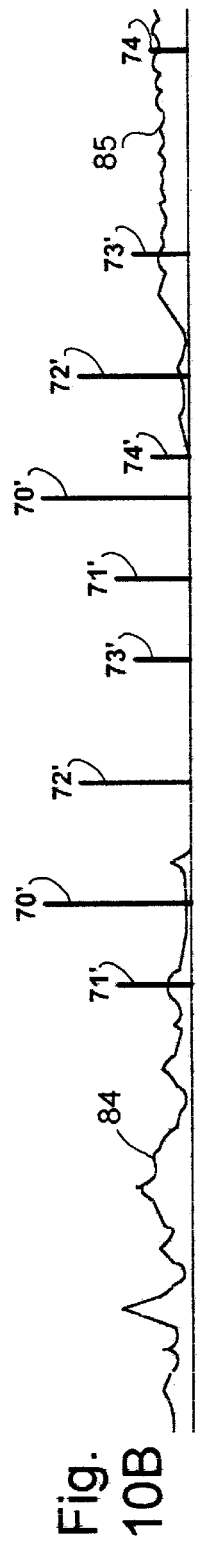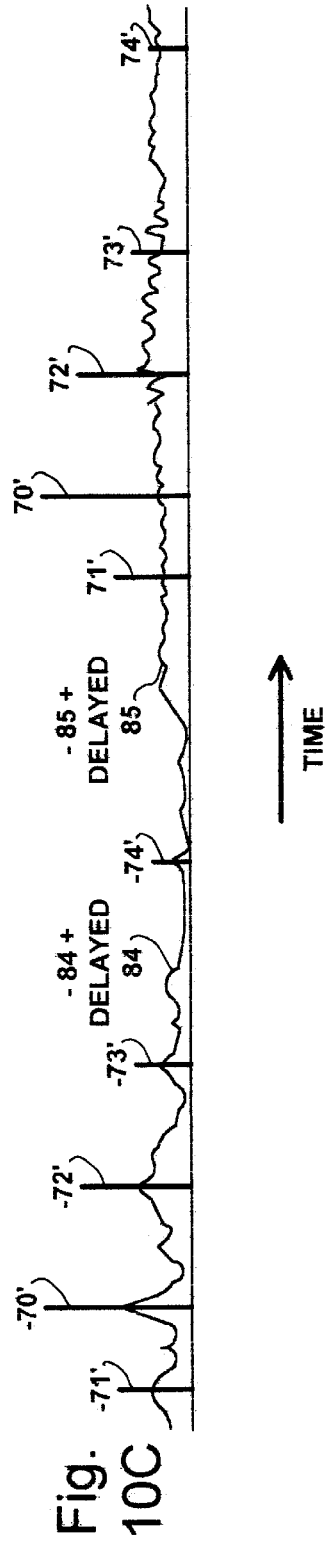

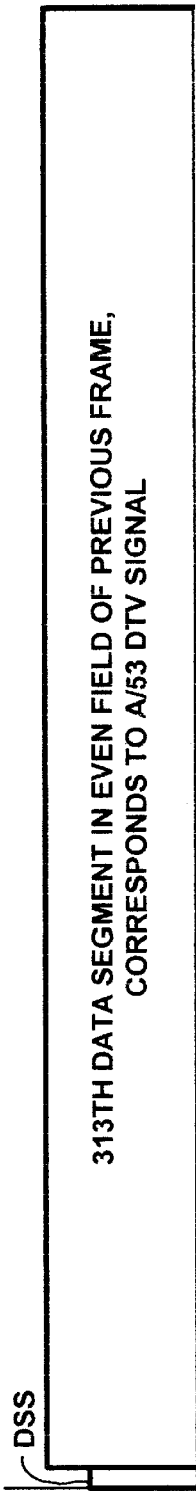
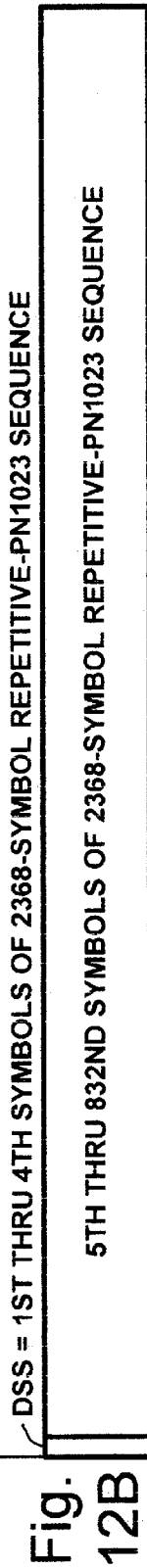
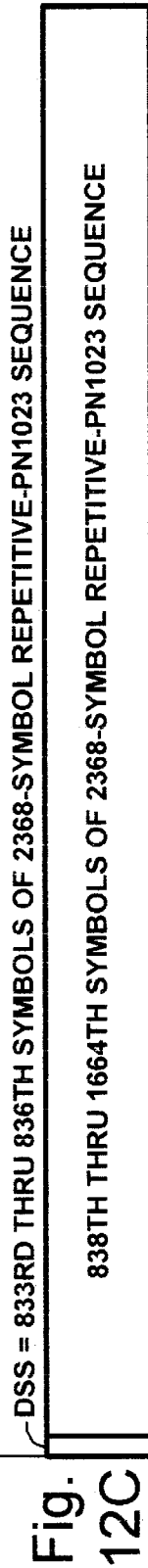
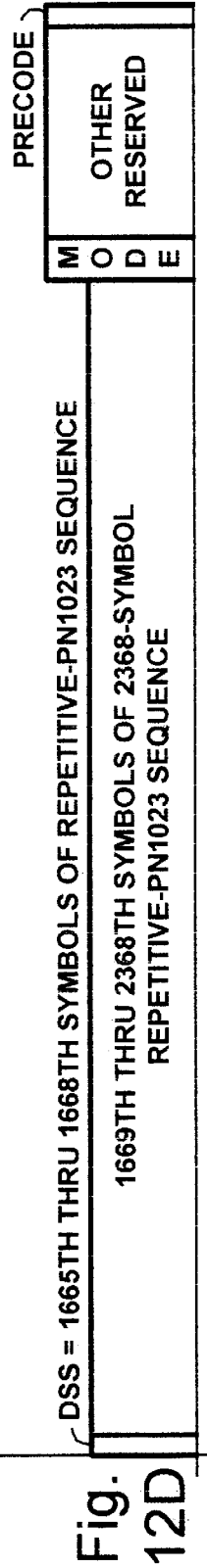

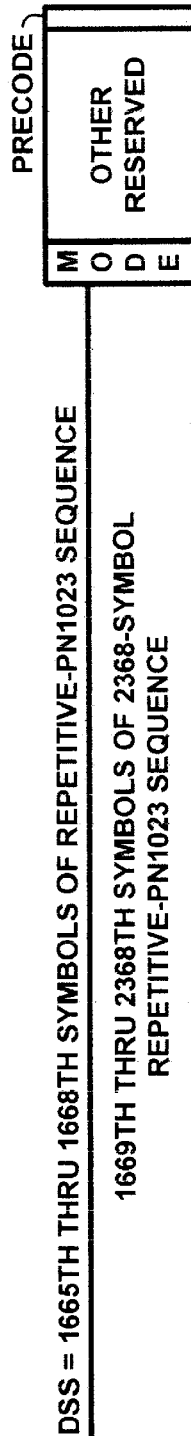

REPETITIVE-PN1023-SEQUENCE ECHO-CANCELLATION REFERENCE SIGNAL FOR SINGLE-CARRIER DIGITAL TELEVISION BROADCAST SYSTEMS

This application is filed under 35 U.S.C. 111(a) claiming pursuant to 35 U.S.C. 119(c)(1) benefit of the filing dates of provisional U.S. patent application Ser. No. 60/217,495 filed pursuant to 35 U.S.C. 111(b) on Jul. 11, 2000 and of provisional U.S. patent application Ser. No. 60/241,158 filed pursuant to 35 U.S.C. 111(b) on Oct. 18, 2000.

The invention relates to digital television (DTV) signals for over-the-air broadcasting, transmitters for such broadcast DTV signals, and receivers for such broadcast DTV signals, which broadcast DTV signals include novel echo-cancellation reference (ECR) signal components or initializing the parameters of adaptive filters used in the DTV receivers for channel-equalization and echo-cancellation.

BACKGROUND OF THE INVENTION

The Advanced Television Systems Committee (ATSC) published a Digital Television Standard in 1995 as Document A/53, hereinafter referred to simply as "A/53" for sake of brevity. Annex D of A/53 titled "RF/Transmission Systems Characteristics" is particularly incorporated by reference into this specification. Annex D specifies that the data frame shall be composed of two data fields, each data field composed of 313 data segments, and each data segment composed of 832 symbols. Annex D specifies that each data segment shall begin with a 4-symbol data-segment-synchronization (DSS) sequence. Annex D specifies that the initial data segment of each data field shall contain a data-field synchronization (DFS) signal following the 4-symbol DSS sequence therein. The fifth through $515^{th}$ symbols in each A/53 DFS signal are a specified PN511 sequence—that is a pseudo-random noise sequence composed of 511 symbols capable of being rendered as +5 or −5 values. The $516^{th}$ through $704^{th}$ symbols in each A/53 DFS signal are a triple-PN63 sequence composed of a total of 189 symbols capable of being rendered as +5 or −5 values. The middle PN63 sequence is inverted in polarity every other data field. The $705^{th}$ through $728^{th}$ symbols in each A/53 DFS signal contain a VSB mode code specifying the nature of the vestigial-sideband (VSB) signal being transmitted. The remaining 104 symbols in the each A/53 DFS signal are reserved, with the last twelve of these symbols being a precode signal that repeats the last twelve symbols of the data in the last data segment of the previous data field. A/53 specifies such precode signal to implement trellis coding and decoding procedures being able to resume in the second data segment of each field proceeding from where those procedures left off processing the data in the preceding data field.

The broadcast TV signal to which the receiver synchronizes its operations is called the principal signal, and the principal signal is usually the direct signal received over the shortest transmission path. Thus, the multipath signals received over other paths are usually delayed with respect to the principal signal and appear as lagging ghost signals. It is possible however, that the direct or shortest path signal is not the signal to which the receiver synchronizes. When the receiver synchronizes its operations to a (longer path) signal that is delayed respective to the direct signal, there will be a leading multipath signal caused by the direct signal, or there will be a plurality of leading multipath signals caused by the direct signal and other reflected signals of lesser delay than the reflected signal to which the receiver synchronizes. In the analog TV art multipath signals are referred to as "ghosts", but in the DTV art multipath signals are customarily referred to as "echoes". The multipath signals that lead the principal signal are referred to as "pre-echoes", and the multipath signals that lag the principal signal are referred to as "post-echoes". The echoes vary in number, amplitude and delay time from location to location and from channel to channel at a given location. Post-echoes with significant energy have been reported as being delayed from the reference signal by as many as sixty microseconds. Pre-echoes with significant energy have been reported leading the reference signal by as many as thirty microseconds. This 90-microsecond or so possible range of echoes of is appreciably more extensive than was generally supposed before spring 2000.

The transmission of the digital television (DTV) signal to the receiver is considered to be through a transmission channel that has the characteristics of a sampled-data time-domain filter that provides weighted summation of variously delayed responses to the transmitted signal. In the DTV signal receiver the received signal is passed through equalization and echo-cancellation filtering that compensates at least partially for the time-domain filtering effects that originate in the transmission channel. This equalization and echo-cancellation filtering is customarily sampled-data filtering performed in the digital domain. Time-domain filtering effects differ for the channels through which broadcast digital television signals are received from various transmitters. Furthermore, time-domain filtering effects change over time for the broadcast digital television signals received from each particular transmitter. Changes referred to as "dynamic multipath" are introduced while receiving from a single transmitter when the lengths of reflective transmission paths change, owing to the reflections being from moving objects. Accordingly adaptive filter procedures are required for adjusting the weighting coefficients of the sampled-data filtering that provides echo-cancellation and equalization.

Determination of the weighting coefficients of the sampled-data filtering that provides equalization and echo-cancellation is customarily attempted using a method of one of two general types. A method of the first general type relies on analysis of the effects of multipath just on an echo-cancellation reference (ECR) signal included in the transmitted signal specifically to facilitate such analysis. A method of the second general type relies on analysis of the effects of multipath on all portions of the transmitted signal. While the PN511 and triple-PN63 sequences in the initial data segments of the data fields in the ATSC standard DTV signal were originally proposed for use as ECR signals, the VSB receiver performance in actual field environments has demonstrated that these sequences are inadequate ECR signals, considered separately or in combination. So, most DTV manufacturers have used decision-feedback methods that rely on analysis of the effects of multipath on all portions of the transmitted signal for adapting the weighting coefficients of the sampled-data filtering. Decision-feedback methods that utilize least-mean-squares (LMS) method or block LMS method can be implemented in an integrated circuit of reasonable size. These decision-feedback methods provide for tracking dynamic multipath conditions reasonably well after the equalization and echo-cancellation filtering has initially been converged to substantially optimal response, providing that the sampling rate through the filtering is appreciably higher than symbol rate and providing that the rate of change of the dynamic multipath does not exceed the slewing rate of the decision-feedback loop, However, these decision-feedback methods tend to be unacceptably slow in converging the equalization and echo-cancellation filtering to nearly optimal response when initially receiving a DTV signal that has bad multipath distortion. Bad multipath distortion conditions include cases where echoes of substantial energy lead or lag the principal received signal by more than ten or twenty microseconds, cases where there is an ensemble of many echoes with differing timings relative to the principal received signal, cases where multipath distortion changes rapidly, and cases where it is difficult to distinguish principal received signal from echo(es) because of similarity in energy level.

Worse yet, convergence is too slow when tracking of dynamic multipath conditions must be regained after the slewing rate of the decision-feedback loop has not been fast enough to keep up with rapid change in the multipath conditions. Data dependent equalization and echo cancellation methods that provide faster convergence than LMS or block-LMS decision-feedback methods are known, but there is difficulty in implementing them in an integrated circuit of reasonable size.

Accordingly, it is desirable to modify A/53 DTV signal to introduce periodically an ECR signal that will "instantly" converge the equalization and echo-cancellation filtering to substantially optimally response. It would be desirable to have an ECR signal that does not interfere with the operation of DTV signal receivers already in the field. However, because of the de-interleaving of VSB-8 signals in the DTV receiver, this is probably an impossible condition to satisfy, at least completely.

U.S. patent application Ser. No. 09/765,019 filed by A. L. R. Limberg on Jan. 18, 2001 and titled "GHOST CANCELLATION REFERENCE SIGNALS FOR BROADCAST DIGITAL TELEVISION SIGNAL RECEIVERS AND RECEIVERS FOR UTILIZING THEM" was published Oct. 25, 2001 as U.S. patent application Ser. No. 2001-0033341Kind Code A1. It describes each data field being extended a prescribed number of data segments to permit the inclusion of ECR signals composed of repetitive-PN511 sequences with baud-rate symbols. Application Ser. No. 20010033341 also specified that the precode signal repeat the last twelve symbols of the 313$^{th}$ data segment, just as in the standard VSB-8 DTV signal. Extension of the data field to include more than 313 data segments minimizes the modifications of the convolutional interleaver in the DTV transmitter and of the corresponding de-interleaver in the DTV receiver that would have to be made in newly designed DTV receivers. However, the extended data fields will interfere with the operation of some receivers already in the field.

Application Ser. No. 200010033341 points out that ECR signal should have sufficient energy that match filtering using auto-correlation procedures can distinguish the longest delayed echoes of the ECR signal from interference caused by other signals and by noise. Accordingly, ECR signals with substantial energy and well-defined auto-correlation responses are a desideratum. The triple PN63 sequence in the initial data segment of each data field of an A/53 broadcast DTV signal has a well-defined auto-correlation response, but has insufficient energy for detecting longer-delayed post-echoes with smaller amplitudes. The PN511 sequence in the initial data segment of each data field of an A/53 broadcast DTV signal has substantial energy and a well-defined auto-correlation response. However, no component sequence of the data field synchronizing (DFS) signal or combination of its component sequences has proven in practice to be very satisfactory as an ECR signal.

One reason is that no portion of the DFS signal is preceded by an information-free interval of sufficient duration that post-echoes of previous data and data segment synchronizing sequences exhibit insignificant spectral energy during the duration of that portion of the DFS signal to be used as ECR signal. Also, the A/53 DTV signals do not provide for the generation of an information-free interval such duration before the ECR signal by combining information sent at different times, a technique used in de-ghosting NTSC analog television signals. A 60-microsecond-long information-free interval extending over 646 symbol epochs should precede the ECR signal if it is not to be overlapped by the post-echoes of previous signals, which post-echoes can have significant energy if delayed no more than sixty microseconds or so. The post-echoes of previous signals should be kept from contributing significantly to digitized Johnson noise, in order to preserve the sensitivity of echo detection. Similarly, no portion of the DFS signal is succeeded by an information-free interval of sufficient duration that pre-echoes of subsequent data and data segment synchronizing sequences exhibit insignificant spectral energy during the duration of that portion of the DFS signal to be used as ECR signal. A 30-microsecond-long information-free interval extending over 323 symbol epochs should succeed the ECR signal if it is not be overlapped by the pre-echoes of previous signals, which pre-echoed can have significant energy if advanced no more than thirty microseconds or so. These information-free intervals preferably should be of even longer durations if auto-correlation filtering employing linear convolution is to be used for echo detection.

Another reason the PN511 sequence in the initial data segment of each data field of an ATSC broadcast DTV signal is not particularly satisfactory as an ECR signal is that the PN511 sequence is not repetitive. Therefore, the auto-correlation properties of the PN511 sequence are compromised. The reader is referred to U.S. Pat. No 5,065,242 titled "DEGHOSITING APPARATUS USING PSEUDORANDOM SEQUENCES" issued 23 Aug. 1994 to Charles Dietrich and Arthur Greenberg. This patent, incorporated herein by reference, pints out that the auto-correlation function of a maximal-length pseudorandom noise (PN) sequence has a cyclic, nature The patent describes repetitive PN sequences being inserted as ECR signal into a prescribed scan line interval of each of the vertical blanking intervals of NTSC analog television signals. U.S. Pat. No. 5,065,242 describes the transmission/reception channel characterization being performed using fast Fourier transform. (FFT) or discrete Fourier transform (DFT) methods.

In this specification and the claims appended thereto the phrase "repetitive pseudo-random noise sequence" is to be construed as being descriptive of a single continuous sequence, rather than as being descriptive of an intermittently repeated pseudo-random noise sequence. The cycle of a repetitive maximal-length PN sequence is defined in this specification and the claims appended thereto to extend over time until the "random" pattern of binary values thereof begins to repeat. This definition is not at variance with common usage. The cycle of a repetitive maximal-length PN sequence is measured by the time between peaks of the autocorrelation function of the PN sequence.

The 90-microsecond of so possible range of echoes that is now known to exist in actual practice is appreciably more extensive than A. L. R. Limberg presumed when on 19 Jan. 2000 he filed provisional U.S. patent application Ser. No. 60/178,081, the priority document for U.S. patent application Ser. No. 09/765,019. Limberg presumed an echo range of only 45 microseconds or so, and the ECR signals specifically described relied on repetitive PN511 sequences with baud-rate symbols rendered as +5 or −5 values. Limberg described the repetitive PN511 sequences being chosen such that they incorporated the |5, −5, −5, |5 symbol sequences at 832-symbol-epoch intervals, which sequences are used as data segment synchronizing (DSS) signals in DTV transmissions made in accordance with A/53. Baud-rate repetitive PN511 sequences are capable of unambiguous detection of echoes over a range of less than 47.5 microseconds.

In spring 2000, when it was reported to-the ATSC Task Force on RF System. Performance that the range of echoes with significant energy apt to be encountered in the field could be 90 microseconds or so wide, A. L. R. Limberg realized that unambiguous detection of echoes over so wide a range would be facilitated by ECR signals that employed baud-rate repetitive PN1023 sequences. The question was whether repetitive PN1023 sequences existed that incorporated the +5, −5, −5, +5 DSS sequences at four consecutive 832-symbol-epoch intervals. While he doubted that such repetitive PN1023 sequence existed, A. L. R. Limberg asked this question of the ATSC Task Force on. RF System Performance using e-mail, indicating he did not have the software for calculating all PN1023 sequences, replicating them and sifting the results.

Surprisingly, D. J. McDonald replied via e-mail later the same day that certain repetitive PN1023 sequences did indeed meet this criterion and that a number of others incorporated the +5, −5, −5, +5 DSS sequences at a lesser number of consecutive 832-symbol-epoch intervals. D. J. McDonald found sequences of the type desired by writing a program for sifting through an already existent file found on line. More DSS sequences have to be subsumed by a repetitive-PN sequence as n increases beyond 8 or so, but this problem is not as difficult as it first appears. As the ($P^n$−1) length of a pseudo-random noise (PN) sequence increases with increase in the number n, the number of sequences increases more than linearly.

Further aspects of the invention concerned exactly how to incorporate the 3096-symbol-epoch triple-PN1023 sequence into the ATSC standard broadcast signal inasmuch as more than three data segments would be required to contain the entire 3096 symbol sequence. C. B. Patel suggested that the DFS signal be modified, eliminating the PN511 sequence and the initial PNT63 sequence to leave room for the tail of a 3096-symbol-epoch triple-PN1023 sequence beginning the third from final data segment of the previous data field. A. L. R. Limberg suggested that the DFS signal be modified, eliminating the PN511 sequence but retaining the initial PN63 sequence, and that the triple-PN1023 sequence be truncated to 3011 symbol epochs. This would still permit linear convolution of a PN1023 auto-correlation filter with the received repetitive-PN1023 sequence to detect without ambiguity echoes extending over a 90-microsecond range.

A. L. R. Limberg and C. B. Patel wanted to truncate the repetitive-PN1023 sequence even further to 2500 symbol epochs, so it could be fitted into three consecutive data segments. This would facilitate leaving the DFS signal in the ATSC standard intact, but would reduce to less than the desired 90 microseconds the range of echoes that could be detected without ambiguity by simply passing the received repetitive PN1023 sequence through a PN1023 auto-correlation filter in a simple linear convolution procedure. D. J. McDonald pointed out that the cyclic nature of the repetitive PN1023 sequence meant that all the echo information required for DFT procedures for characterizing the channel reposed in a interior cycle of the PN1023 sequence overlapped only by echoes of itself and flanking PN1023 signal. This permits DFT procedures to detect echoes without ambiguity over an echo range approaching 95 microseconds width, so long as there are at least two cycles of PN1023 sequence in the ECR signal. The interior cycle of the PN1023 sequence can be looped back on itself to extend the sequence in length for calculation purposes.

When A. L. R. Limberg relayed this observation to C. B. Patel, Dr. Patel discerned that looping an interior cycle of the PN1023 sequence back on itself permitted circular convolution with the kernel of a PN1023 auto-correlation filter, for detecting echoes without ambiguity over an echo range approaching 95 microseconds width, so long as there are at least two cycles of PN1023 sequence in the ECR signal

SUMMARY OF THE INVENTION

Aspects of the invention concern incorporating echo-cancellation reference (ECR) signals into a DTV signal with a symbol rate of around 10.76 million samples per second, wherein each of the ECR signals includes or essentially consists of a repetitive PN-1023 sequence with baud-rate symbols rendered as +5 or −5 values, which repetitive-PN1023 sequence incorporates a number of consecutive data-segment-synchronization signals. Other aspects of the invention concern transmitters and receivers for such signals.

BRIEF DESCRIPTION OF THE DRAWING

FIGS. 1A and 1B together are a listing, row by row, left to right, of the symbols in a repetitive-PN1023 sequence that is used generating broadcast digital television signals transmitted in accordance with an aspect of the invention

FIGS. 3A, 3B, 3C, 3D, 3E, 3F, 3G, 3H, 3I, 3J, 3K and 3L are timing diagrams that depict the symbol content of respective data segments in broadcast digital television signals transmitted in accordance with an aspect of the intention.

FIG. 8A is a graph versus time of the cyclically repeating cepstrum of a signal received under multipath reception conditions, as that cepstrum is determined in the receiver portion of FIG. 5 or in the receiver portion of FIG.

FIGS. 8B, 8C and 8D are each a graph plotted against the same time scale as FIG. 8A showing successive steps in unwrapping the cyclically repeating cepstrum of the of FIG. 8A to develop an extended cepstrum.

FIGS. 10A, 10B and 10C are graphs, versus the same time abscissa, of time-domain responses at points in circuitry in the FIG. 9 apparatus used for further analyzing the pre-echo portion of the cepstrum.

FIGS. 12A, 12B, 12C, 12D, 12E, 12F, 12G, 12H, 12I, and 12J are timing diagrams that depict the symbol content of respective data segments in broadcast digital television signals of the type shown in FIG. 11.

DETAILED DESCRIPTION

Figure 1A:
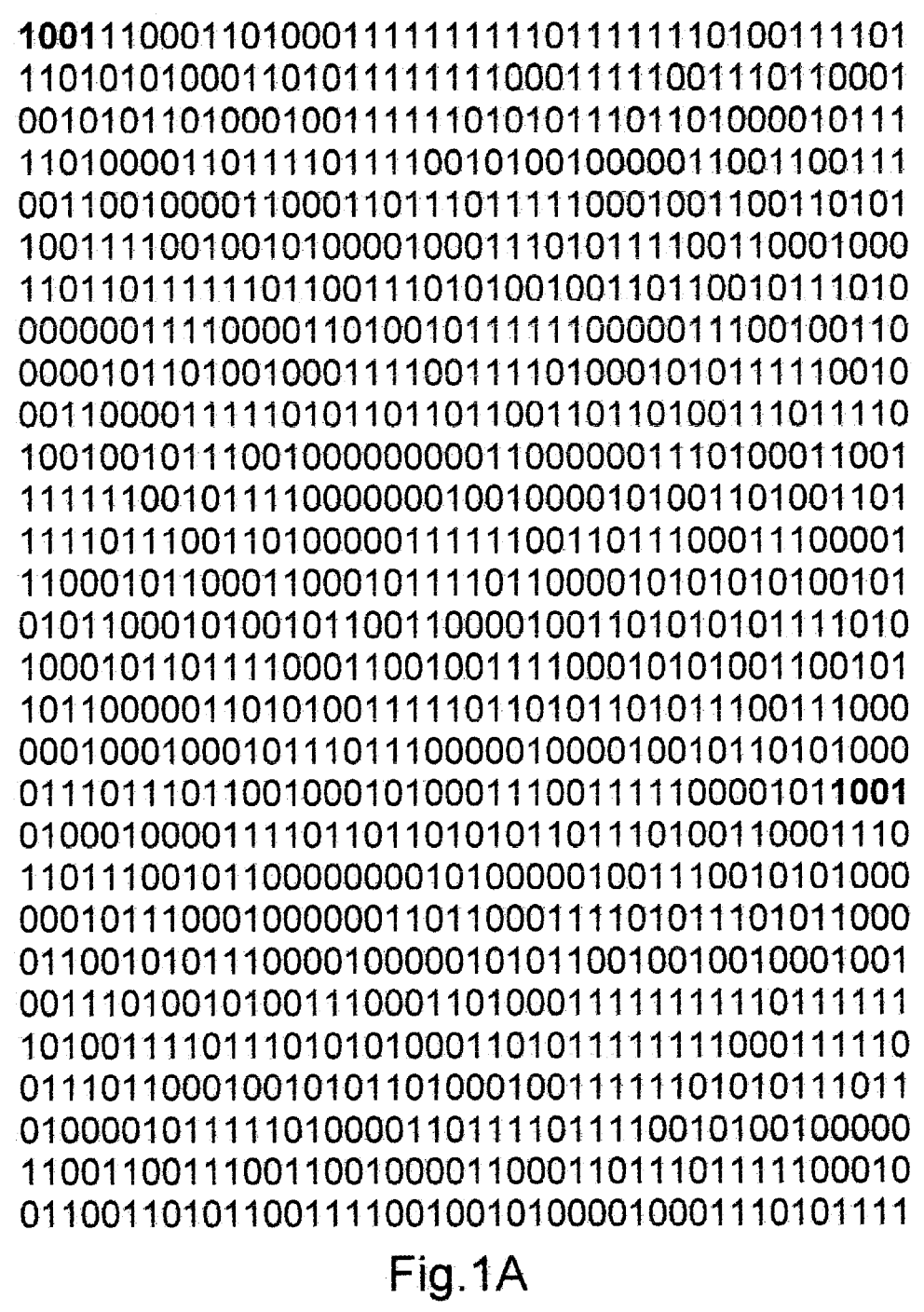
Figure 1B:
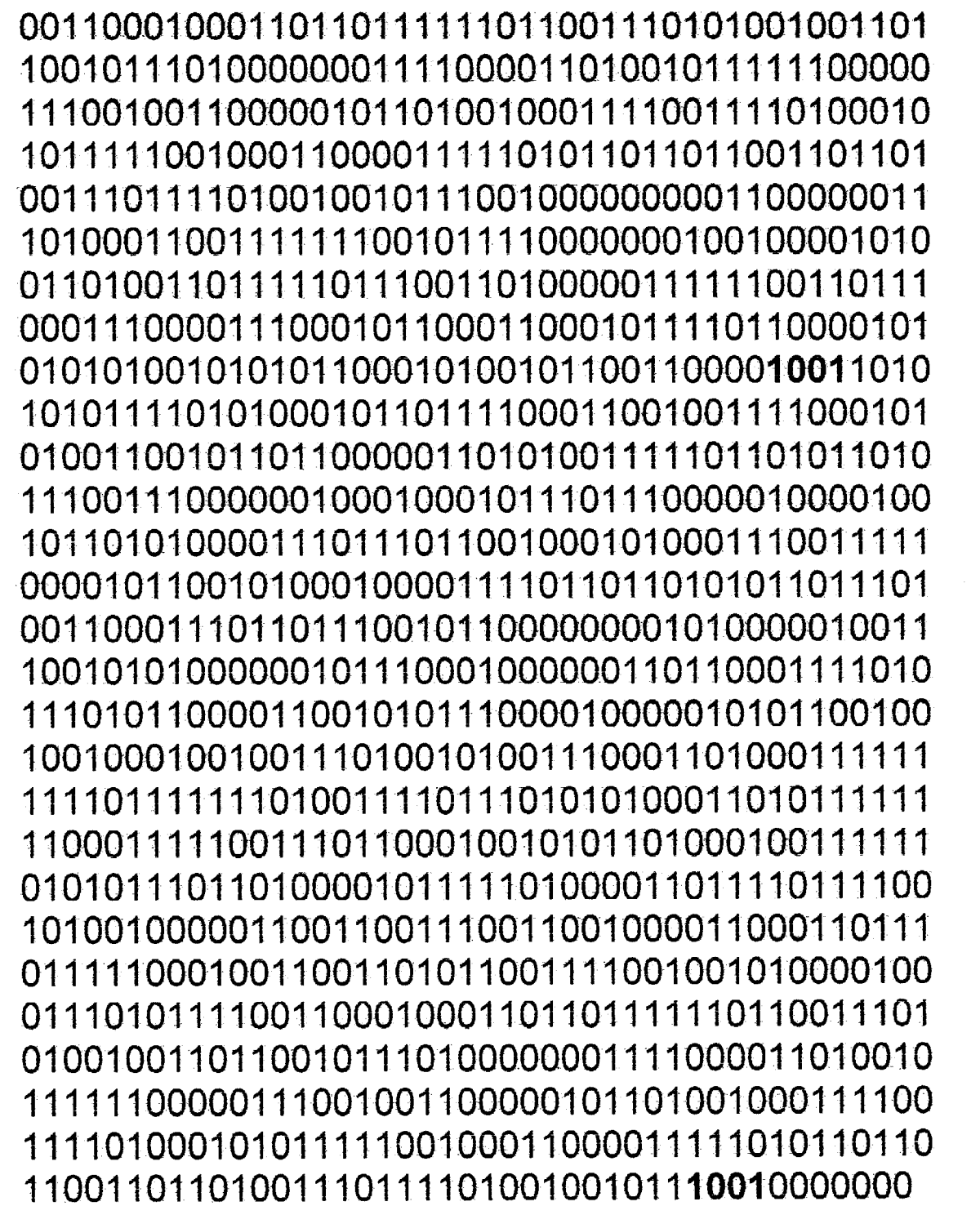

FIGS. 1A and 1B together provide a listing, row by row, left to right, of the consecutive symbols in a 2507-symbol repetitive-PN1023 sequence that can be used in implementing the invention in various of its aspects. The ONEs in the 2507-symbol repetitive-PN1023 sequence correspond to +5 carrier modulation values in the digital television signal, and the ZEROs in the 2507-symbol repetitive-PN1023 sequence correspond to −5 carrier modulation values. The repetitive-PN1023 sequence is used for modulating the vestigial-sideband carrier during the $314^{th}$, $315^{th}$ and $316^{th}$ data segments that conclude each data field and during the first eleven symbols in the initial data segment of the next data field. The repetitive-PN1023 sequence begins with a 1001 sequence that modulates the vestigial-sideband carrier as a data segment synchronizing (DSS) signal and has other such sequences 832, 1664 and 2496 symbol epochs later. Except for these DSS signals, modulation of the vestigial-sideband carrier in accordance with the repetitive-PN1023 sequence does not otherwise contain +5, −5, −5, +5 sequence at similar positioning in 832-symbol data segments. If the order of the symbols in the FIG. 1 repetitive-PN1023 sequence is reversed, these favorable properties still obtain, There are more than these two PN1023 sequences with the described desirable properties, J. D. McDonald having found two families of them. The particular repetitive 1023 sequence show in FIGS. 1A and 1B is preferred since it overlaps the PN511 sequence in the initial data segment by seven symbol epochs, the longest overlap of any known repetitive-PN1023 sequence.

Figure 2:
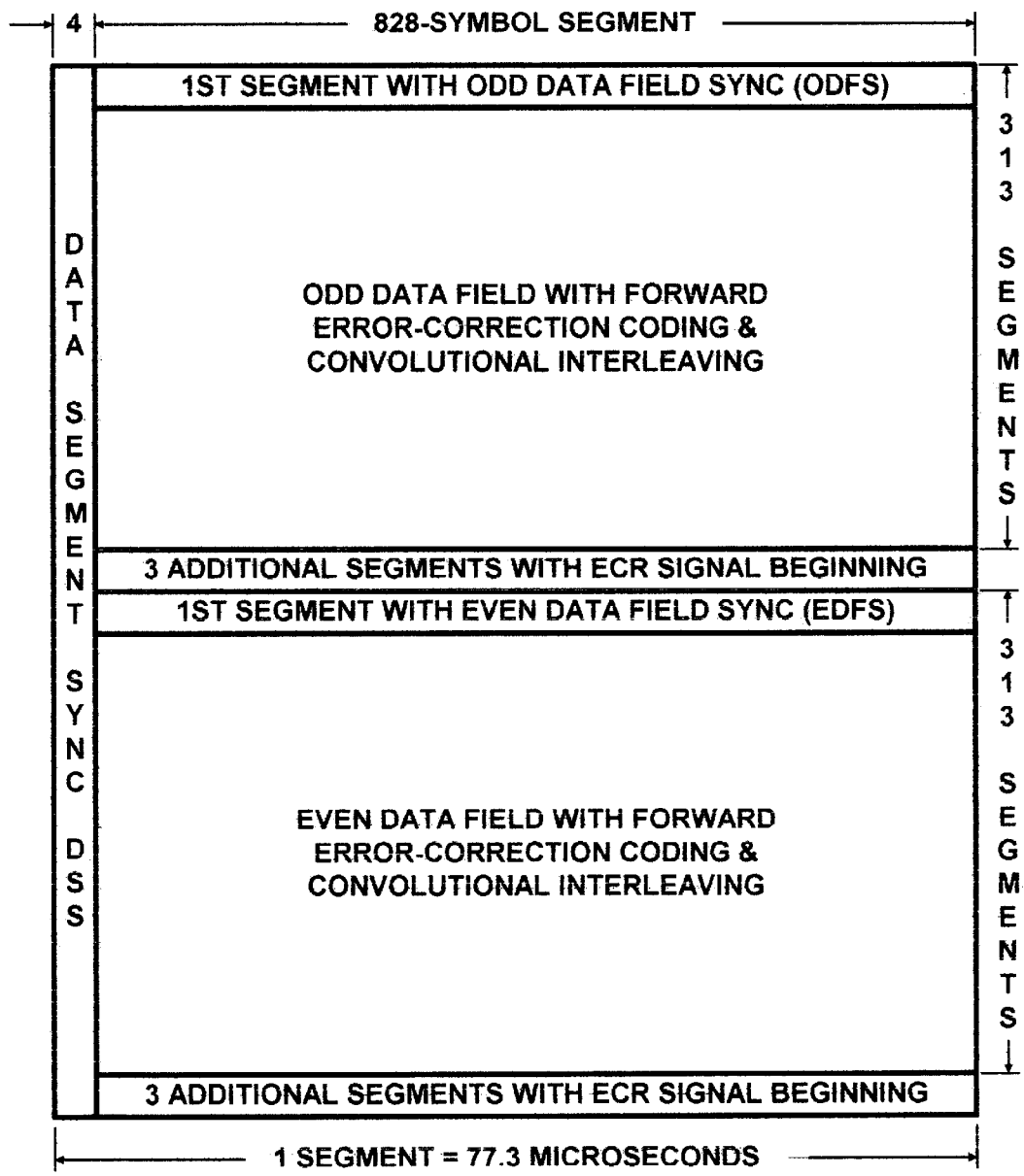
FIG. 2 is a diagram of an ATSC digital television signal data frame modified in accordance with an aspect of the invention to include three extra data segments at the end of each of its two data fields, which extra segments contain a repetitive-PN 1023-sequence training signal for the adaptive filtering that provides channel-equalization and echo-cancellation.

FIG. 2 is a diagram of an ATSC digital television signal data frame modified to include three extra data segments at the end of each of its two data fields. The initial data segment in each data field is the same as specified by A/53, the final twelve symbols from the $313^{th}$ data segment of each data field being used to form the precode concluding the first data segment of the next data field. Repetitive-PN1023 sequence training signal for equalization and echo-cancellation filtering is included in the three additional data segments in each data field and in several embodiments of the invention a portion of the first data segment of the next data field. In the embodiment of the invention described above the repetitive-PN1023 sequence overlaps the PN511 sequence in the initial data segment by seven symbol epochs. In other embodiments of the invention the conclusion of the training signal replaces one or more of the pseudo-random (PN) sequences in the first data segment of each data field.

At the DTV transmitter the operations of the interleaver and trellis coder are suspended during the transmission of the $314^{th}$, $315^{th}$ and $316^{th}$ data segments added to each data field, as well as during the initial data segment of each data field. At these times the operations of the trellis decoder and of the de-interleaver in a DTV receiver especially designed for receiving the FIG. 2 broadcast digital television signal are also suspended, A DTV receiver designed to receive DTV signals broadcast in accordance with the 1995 ATSC Standard is unlikely to be designed such that the operations of the trellis decoder and of the de-interleaver are suspended during the $314^{th}$, $315^{th}$ and $316^{th}$ data segments added to each data field. If the operations of the trellis decoder and of the de-interleaver are not so suspended, the de-interleaved data will contain errors that cannot be corrected by th Reed-Solomon error-correction circuitry following the de-interleaver.

FIGS. 3A, 3B, 3C and 3D depict the symbol content of the $313^{th}$, $314^{th}$, $315^{th}$ and $316^{th}$ data segments of the even data field of a previous data frame in a FIG. 2 DTV signal broadcast in accordance with the invention. FIGS. 3E and 3F graph the symbol content of the initial and second data segments of the succeeding odd data field in the current data frame. FIGS. 3G, 3H, 3I and 3J depict the symbol content of the $313^{th}$, $314^{th}$, $315^{th}$ and $316^{th}$ data segments, of that succeeding odd data field. FIGS. 3K and 3L graph the symbol content of the initial and second data segments of the even data field of the next data frame.

The second through $313^{th}$ data segments of the data fields can be the same as those specified in A/53. The third through $312^{th}$ data segments of the odd field of the current frame, which would occur in the time interval between the conclusion of the second data segment shown in FIG. 3F and the beginning of the $313^{th}$ data segment shown in FIG. 3G are omitted from the drawing for reasons of economy of drawing.

The $314^{th}$, $315^{th}$ and $316^{th}$ data segments concluding each data field contain the first 2496 symbols of the repetitive-PN1023-sequence ECR signal, which continues into the initial data segments of the succeeding data fields. FIGS. 3B, 3C and 3D show the first 2496 symbols of the repetitive-PN1023-sequence ECR signal inserted into the $314^{th}$, $315^{th}$ and $316^{th}$ data segments of the even data field of the data frame previous to the current data frame depicted in FIGS. 3E, 3F, 3G, 3H, 3I, and 3J. FIGS. 3H 3I and 3J show the first 2496 symbols of the repetitive-PN1023 sequence ECR signal inserted into the $314^{th}$, $315^{th}$ and $316^{th}$ data segments of the odd data field of the current data frame. The data segment synchronizing (DSS) signals of the $314^{th}$, $315^{th}$ and $316^{th}$ data segments of each data field are incorporated within the repetitive-PN1023-sequence ECR signal transmitted during those data segments. So is the DSS signal at the beginning of the initial data segment of the succeeding field, and so are the first seven symbols of the PN511 component of that initial data segment, as depicted in FIGS. 3E and 3K.

The repetitive-PN1023 sequence of FIGS. 3B, 3C, 3D and 3E varies between −5 and +5 modulation levels in the 8-VSB signal, as A/53 specifies such modulation levels. The repetitive-PN1023 sequence of FIGS. 3H, 3I, 3L and 3K also varies between −5 and +5 modulation levels. These modulation levels for the repetitive-PN1023 sequences facilitate the 4-symbol DSS sequences being incorporated within these repetitive-PN1023 sequences.

The initial data segment of an odd data field, as shown in FIG. 3E, and the initial data segment of a succeeding even data field, as shown, in FIG. 3K, each begin with a 4-symbol data segment sync (DSS) sequence followed by the PN511 sequence prescribed by A/53. The conclusion of the repetitive-PN1023 sequence is followed by a 189-symbol triple PN63 sequence, a 24-symbol mode code, and a 104-symbol reserved portion that concludes the data segment. In FIG. 3K the PN511 sequence is followed by a 189-symbol triple PN63 sequence differing from that in FIG. 3E in that the middle PN63 sequence in the triple PN63 sequence is opposite in sense of polarity to the other PN63 sequences.

Figure 4:
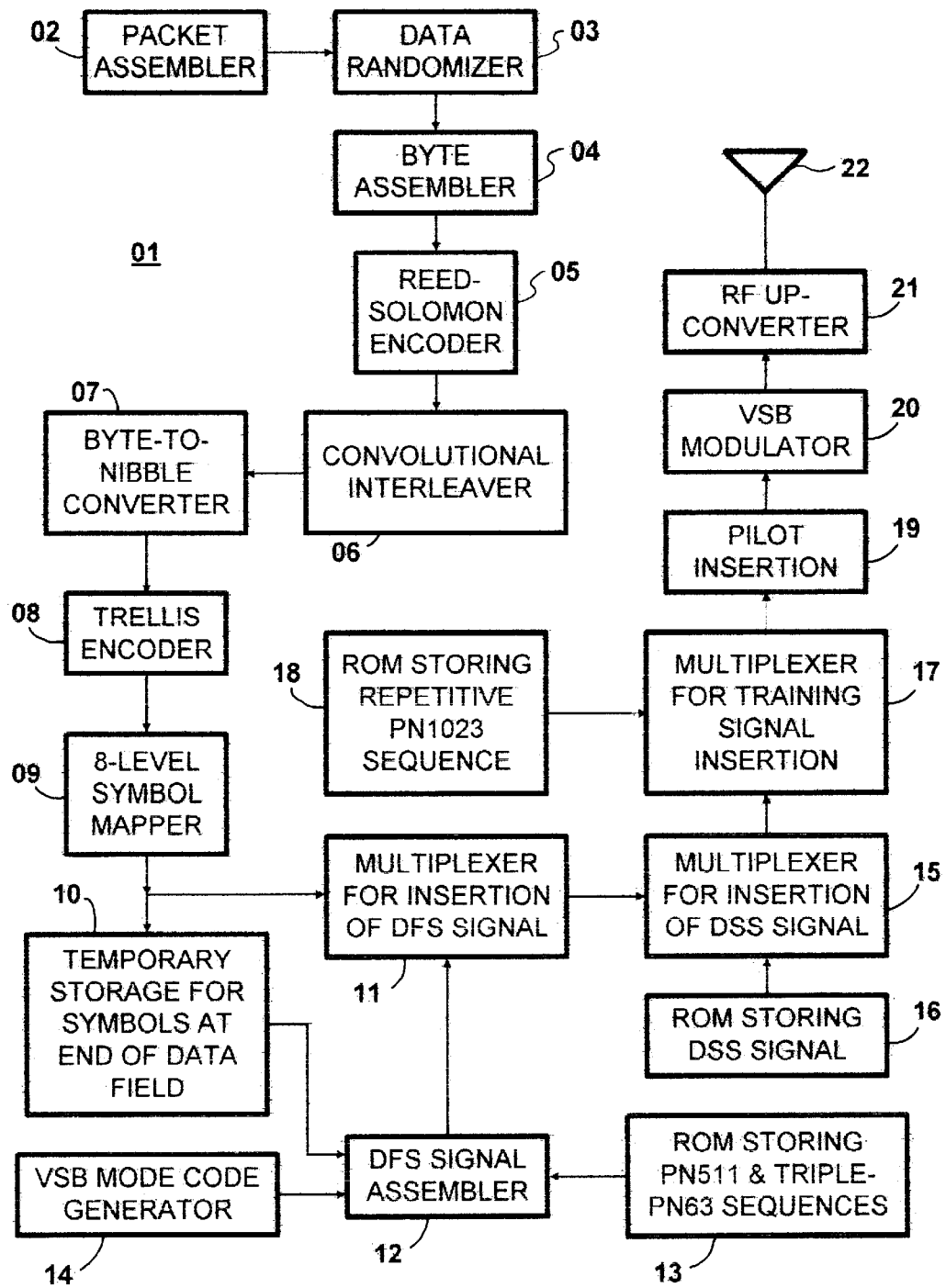
FIG. 4 is a block schematic diagram of a transmitter for transmitting broadcast digital television signals in accordance with an aspect of the invention.

FIG. 4 shows a digital television transmitter 01 for transmitting broadcast digital television signals in accordance with an aspect of the invention. The transmitter 01 includes a packet assembler 02 of conventional type for assembling packets of MPEG-2 Standard video data, packets of AC-3 Standard audio data, and packets of other data into a data stream. The packet assembler 02 is sometimes called the "transport-stream multiplexer". The packet assembler 02 is connected to supply the data stream it assembles to a data randomizer 03 of the type specified in A/53, Annex D, Section 4.2.2. The data randomizer 03 exclusive-ORs all the incoming data with a $(2^{17}-1)$ symbol maximal-length PN sequence, which is initialized at the beginning of each data field. The data randomizer 03 is connected for supplying randomized data to a byte assembler 04. The byte assembler 04 is connected or supplying randomized data in eight-bit bytes to a Reed-Solomon coder 05 of (207, 187) type as specified in A/53, Annex D Section 4.2.3. The Reed-Solomon coder 05 is connected to a convolutional interleaver 06 for supplying it bytes of randomized data with forward-error-correction codes inserted therein. The convolutional interleaver 06 supplies bytes of interleaved data descriptive of data segments 2 through 313 of each interleaved data field that is to be transmitted.

The convolutional interleaver 06 is connected to supply these bytes of interleaved data to a byte-to-nibble converter 07, which converts those bytes to a stream of two-bit nibbles. The byte-to-nibble converter 07 is connected to supply this nibbles stream to a trellis encoder 08, which performs ⅔ rate trellis coding of the type prescribed in A/53. The trellis encoder 08 is connected to supply its trellis-coded output signal to an 8-level symbol mapper 09 of the type prescribed in A/53. The last twelve symbols resulting from data segment 313 of the interleaved data field are stored temporarily in temporary storage register 10, to be used subsequently as precode at the conclusion of the initial data segment of the next data field.

A time-division multiplexer 11 is connected for receiving symbols from the symbol mapper 09. The time-division multiplexer 11 inserts a data field synchronization (DFS) signal into the trellis-coded signal before data segment 2 of each transmitted data field. The multiplexer 11 is connected for receiving the DFS signal from a DFS signal assembler 12. The DES signal assembler 12 assembles the PN511 and triple-PN63 sequences read from a read only memory 13 at the beginning of the DFS signal, a VSB mode code supplied from a VSB mode code generator 14 or permanently wired, a "reserved" signal if available, and the precode stored in the temporary storage register 10.

The time-division multiplexer 11 is connected for supplying is output signal to another time-division multiplexer 15. The time-division multiplexer 15 inserts a data segment synchronization (DSS) signal at the beginning of each data segment of each transmitted data field. As shown in FIG. 4, the DSS signal can by way of example be supplied to the multiplexer 15 from a read-only memory 16 from at suitable times.

In FIG. 4 the time-division multiplexer 15 is connected for supplying its output signal to still another time-division multiplexer 17. The time-division multiplexer 17 is designed so that its output signal reproduces the time-division multiplexer 15 output signal with the following modification. ECR signal read from a read-only memory 18 is inserted into the multiplexer 17 output signal following data segment 313 of each transmitted data field.

FIG. 4 shows pilot insertion circuitry 19 connected for receiving the time-division multiplexer 17 output signal. The pilot insertion circuitry 19 adds a direct component to the multiplexer 17 output signal to generated a modulating signal input for a vestigial-sideband modulator 20 that includes a balanced modulator in its construction. The direct component unbalances the balanced modulator, so the VSB modulator 20 output signal includes a pilot carrier at the carrier frequency. Alternatively, the pilot insertion can be done after modulation. In most commercial DTV transmitter designs the VSB modulator 20 output signal is at an intermediate frequency. A radio-frequency up-converter 21 converts this VSB modulator 20 output signal upward in frequency to the allocated radio-frequency transmission channel in the VHF or UHF band and amplifies the power of the radio-frequency signal applied to a transmitting antenna 22.

The FIG. 4 arrangement is most simply clocked at bad rate beginning with the byte-to-nibble converter 07 output signal, introducing nulls into appropriate portions of the convolutional interleaver 06 output signal to accommodate insertions by the time-division multiplexers 11, 15 and 17. As one skilled in the art of electronic design will readily perceive, time-division-multiplexer circuitry other than that using multiplexers 11, 15 and 17 connected per FIG. 4 can be used for generating a modulating signal by inserting a data field synchronization signal into the trellis-coded signal for each transmitted data field, for inserting a data segment synchronization signal into each data segment of each transmitted data field, and for inserting a non-trellis-coded signal descriptive of the repetitive PN1023 sequence into a prescribed portion of each transmitted data field. One can modify the ROM 18 to store the repetitive-PN1023-sequence ECR signal exclusive of the DSS sequences and reverse the order in which the time-division multiplexers 15 and 17 are cascaded, for example. This facilitates addressing the ROMs 13 and 18 from a common address counter. Another design possibility is to insert DSS signals into the output signals of the symbol mapper 08 and DFS signal assembler 12 independently, before the time-division multiplexer 17 inserts the repetitive PN1023 sequence ECR signal read periodically from the ROM 18.

Figure 5:
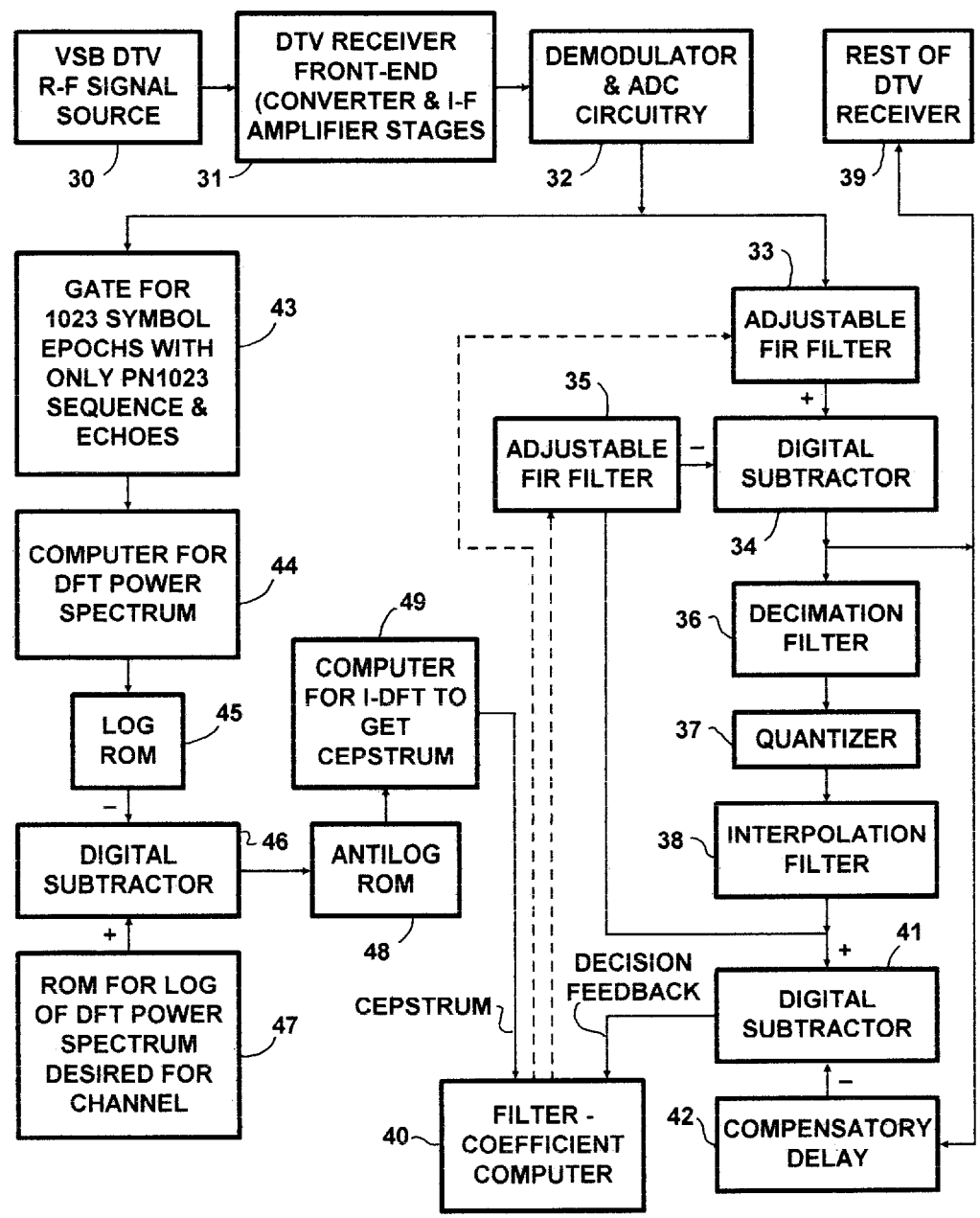
FIG. 5 is a schematic diagram of a portion of a receiver for broadcast digital television signals, which receiver portion includes an adaptive filter for providing channel-equalization and echo-suppression at baseband, and which receiver portion in accordance with a further aspect of the invention includes apparatus utilizing the signal of FIGS. 3A, 3B, 3C, 3D, 3E, 3F, 3G, 3H, 3I, 3J, 3K and 3L in DFT computations used in calculating weighting coefficients for the adaptive filter.

FIG. 5 shows a receiver for broadcast DTV signals capable of utilizing repetitive-PN1023-sequence training signals included in those broadcast DTV signals. A source 30 of radio-frequency vestigial-sideband DTV signal, such as a reception antenna, supplies that VSB DTV R-F signal to a DTV receiver front-end 31 comprising tuner and intermediate-frequency (I-F) amplifier stages. The DTV receiver front-end 31 supplies amplified I-F signal to demodulator and analog-to-digital conversion circuitry 32. The circuitry 32 can take any one of a variety of known forms. Forms of the circuitry 32 in which the amplified I-F signal is digitized by an analog-to-digital converter before demodulation is done in the digital regime are preferred. Alternatively, forms of the circuitry 32 in which demodulation is done in the analog regime with the analog baseband demodulation result subsequently being digitized by an analog-to-digital converter are used instead. The analog-to-digital conversion is performed at a rate higher than the baud rate, so that the phase modulation of received signal that occurs during dynamic multipath reception can be tracked.

Performing the analog-to-digital conversion at a multiple of baud rate is advantageous because having an integral number of samples per symbol epoch simplifies the design of digital filters in the receiver. Decimation filtering to baud rate before data slicing is facilitated, for example. Auto-correlation filters for PN sequences can be constructed without need for digital multipliers, by way of further example. Adaptive filtering to perform factional equalization is facilitated as well.

Demodulator and analog-to-digital conversion circuitry 32 supplies digitized baseband DTV signal. Although FIG. 5 does not explicitly show it, in line with conventional practice this digitized baseband DTV signal is subjected to band-shaping filtering including Nyquist-slope filtering before its application as in put signal to adaptive filtering used for channel equalization and echo-cancellation, which adaptive filtering can take a variety of known forms. FIG. 5 shows a representative form of the adaptive filtering which comprises a first finite-impulse-response (FIR) filter 33 with adjustable weighting coefficients followed in cascade by an infinite-impulse-response (IIR) filter composed of elements 34–38. The response of the first FIR filter 33 is supplied as the IIR filter input signal, which is applied as minuend input signal to a subtracter 34 in the IIR filter. The subtrahend input signal to the subtractor 34 is the response of a second FIR filter 35 with adjustable weighting coefficients. The subtractor 34 supplies its difference output signal as the IIR filter output signal, which is supplied as input signal to the rest 39 of the DTV receiver per conventional practice. Further on in this specification the rest 39 of the DTV receiver is described in detail with reference to FIG. 7 of the drawing.

The IIR filter output signal is processed for application as input signal to the second FIR filter 35, completing a degenerative feedback loop through the second FIR filter 35, the subtractor 34 and intervening elements 36–38. This feedback loop provides the tentative filtering that gives rise to "infinite" impulse response. Alternatively, "infinite" impulse response could be obtained by directly applying the difference output signal from the subtractor 34 to the second FIR filter 35 as its input signal. However, adjustment of the weighting coefficients of the FIR filters 33 and 35 by data-directed methods is facilitated by replacing the filtered received signal by an estimation of the actually transmitted signal based on the filtered received signal. The output signal of the adaptive filtering for performing equalization and echo-cancellation, which is supplied as difference output signal from the subtractor 34, is sampled at a rate higher than baud rate, preferably a multiple of baud rate. A decimation filter 36 responds to the difference output signal from the subtractor 34 to supply a quantizer 37 an input signal at baud rate. The quantizer 37 generates, at baud rate, estimates of the symbols actually transmitted. These estimates are applied as input signal to an interpolation filter 38 which resamples them to the same sample rate as the difference output signal from the subtractor 34. The interpolation filter 38 response is applied to the second FIR filter 35 as its input signal.

A small dedicated computer 40 computes weighting coefficients that are supplied to weighting-coefficient registers for the FIR filters 33 and 35. FIG. 5 does not show these weighting-coefficient registers separately.) Whenever the DTV receiver is powered up after not receiving power for some time, whenever the reception channel is changed, or wherever the error-correction circuitry indicates a current set of weighting coefficients to be seriously in error, a set of weighting coefficients that have been derived from the repetitive-PN1023-sequence training signal are loaded into the computer 40. This set of weighting coefficients is then supplied to the weighting-coefficient registers for the FIR filters 33 and 35, as well as providing a basis for the computer 40 further adjusting the weighting coefficients by a data-directed method utilizing a decision-feedback error signal generated by a digital subtractor 41 as its difference output signal. The digital subtractor 41 generates the decision-feedback-error signal by comparing the output signal of the adaptive filtering for performing equalization and echo-cancellation with estimates of the actually transmitted signal as resampled by the interpolation filter 38. More particularly, the response of the interpolation filter 38 is supplied to the subtractor 41 as its subtrahend input signal, and the difference output signal from the subtractor 34 is delayed by a digital delay line 42 before being applied to the subtractor 41 as its minuend input signal. The delay line 42 delays the subtractor 34 difference output signal sufficiently to compensate for the combined latent delays through the decimation filter 36, the quantizer 37 and the interpolation filter 38. The sampling rate of the decision-feedback error signal that the subtractor 41 generates as its difference output signal corresponds with the fractional-symbol tap spacing of the weighting coefficients of the FIR filters 33 and 35.

Of particular interest to the invention is the way that a set of weighting coefficients is determined from the repetitive-PN1023-sequence training signal depicted in FIGS. 3B, 3C, 3D, 3E, 3H, 3I, 3J and 3K. Demodulator and analog-to-digital conversion circuitry 32 supplies digitized baseband DTV signal to gating circuitry 43, similar to the digitized base and DTV signal supplied to the adaptive filtering used for channel-equalization and echo-cancellation. The gating circuitry 43 selects to a computer 44 a 1023-symbol-epoch portion of the digitized baseband DTV signal from the $314^{th}$, $315^{th}$ and $316^{th}$ data segments of each data field. This 1023-symbol-epoch portion is chosen to occur after the disappearance of the longest-delayed post-echo of the data in the $310^{th}$ segment, but before the appearance of the earliest pre-echo of the DFS signal in the initial data segment of the succeeding data field starting the 1023-symbol-epoch portion in the $312^{th}$ data segment means that post-echoes of the data in the $310^{th}$ segment that are delayed less than 78.3 microseconds are all past. Starting the 1023-symbol-epoch portion at the very beginning of the $312^{th}$ data segment would require that pre-echoes of the DFS signal in the initial data segment of the succeeding data field be advanced a little over 59.5 microseconds in order to overlap such 1023- symbol-epoch portion. Starting the 1023-symbol-epoch portion just after the DSS sequence in the $312^{th}$ data segment is preferred inasmuch as it facilitates that DSS sequence enabling a counter used for timing the gating of the selected 1023-symbol-epoch portion to an input storage register in the computer 44.

The computer 44 is a small computer dedicated for calculating the DFT power spectrum of the portion of the 1023-symbol-epoch portion of digitized baseband DTV signal that the gating circuitry 43 selects to the computer 44. These power spectrum calculations are performed after resampling the selected signal so set of samples supplied for DFT calculation contains a number of samples that is an integral power of two. DFT calculation is facilitated by basing it on an integer power of two samples of the time-domain signal. Samples of the DFT power spectrum computed by the computer 44 are applied serially to linear-to-logarithm conversion read-only memory 45. The ROM 45 supplies its logarithmic samples to a digital subtractor 46 as its subtrahend input signal.

A read-only memory 47 serially generates samples of the logarithm of an ideal DFT power spectrum for the transmission channel and supplies those logarithmic samples to the subtractor 46 as its minuend input signal. The ideal DFT power spectrum for the transmission channel that is stored in the ROM 47 corresponds with the results of a lowpass filtering of the power spectrum for the PN1023 sequence as resamples to contain the same number of samples that is an integral power of two as in the resampled response to the signal that the gating circuitry 43 selects. The lowpass filtering is done with an ideal lowpass filter characteristic having a Nyquist slope roll-off that minimizes intersymbol interference.

The difference output signal from the subtractor 46 is supplied to a read-only memory 48 that stores antilogarithm look-up tables. The response of the ROM 48 is supplied to a computer 49 which computes the inverse discrete Fourier transform (I-DFT) of that response to generate a time-domain description of the transmission/reception channel system response to an impulse. This "channel impulse response" or "CIR" in the time domain is referred to as a "cepstrum", the word "cepstrum being an anagram of the word "spectrum" descriptive of the transmission/reception channel system response in the frequency domain. The cepstrum takes the form of a succession of pulses at time intervals indicative of the relative delays of respective multipath components and within amplitudes indicative of the relative amplitudes of those multipath components. This time-domain description is supplied to the computer 40, which generates therefrom a set of initial weighting coefficients for the adaptive filtering used to equalize the transmission/reception channel and suppress echoes.

Methods for computing the initial weighting coefficients from the cepstrum are known in the art. The weighting coefficients for the second FIR filter 35 used for suppressing longer-delayed post echoes are generated by simply scaling from corresponding terms in the cepstrum. The weighting coefficients for the first FIR filter 33 can be computed by scaling from the inverse-DFT of the term-by-term complex reciprocals of the portion of the cepstrum descriptive of the pre-echoes and short post-echoes that the first FIR filter 33 is to suppress.

The set of weighting coefficients first generated after the DTV receiver is energized, or after the DTV receiver tunes to receive a different channel, is used to initialize the coefficients of the adaptive filtering. Thereafter, the computer 40 adapts the weighting coefficients incrementally using decision-feedback technique. Each time a new set of weighting coefficients is generated from the ECR signal extracted from the final data segments of a new data field, the computer 40 compares that set to the set of weighting coefficients as adjusted using decision-feedback technique. When the comparison indicates the set of weighting coefficients as adjusted using decision-feedback technique is in error, the adaptive filtering coefficients are re-initialized using the set of weighting coefficients most recently generated from the ECR signal.

Resampling the 1023-symbol-epoch portion of digitized baseband DTV signal that the gating circuitry 43 selects to the dedicated computer 44 for calculating the DFT power spectrum of 44 maps the one cycle of the PN sequence information to one cycle of DFT, so there is a seamless transition from the conclusion of the cycle to its beginning in the modular signal that theoretically extends over all time. Similar sampling procedures are employed to define the DFT power spectrum of the ideal channel response to the Nyquist-limited PN1023 sequence. These procedures cause the cycle-to-cycle aliasing of these signals in the time domain to be such that each exhibits the correct wrap-around so that the aliasing will not affect de-convolution procedures in the Nyquist-limited frequency domain. These resampling procedures are more easily performed outside-real time of course.

Alternatively, the DTV receiver can be designed so the demodulator and analog-to-digital conversion circuitry 32 supplies baseband DTV signal sampled at an integer multiple of 1024/1023 times baud rate. This clock rate simplifies DFT calculations, but complicates the design of decimation filter 36, the interpolation filter 38 and the rest 39 of the DTV receiver.

The inventors have discerned practical designs that avoid the extensive multiplication procedures associated with the interpolative filtering for resampling the PN sequences, which designs the inventors believe to be inventive over previous designs more closely following the precepts of U.S. Pat. No. 5,065,242. These practical designs approximate the transmission/reception channel characteristic with sufficient precision that initial filter coefficients can be calculated for the adaptive filtering used for channel equalization and echo cancellation, which initial filter coefficients will open the eye characteristic of the DTV signal sufficiently that estimates can be generated of which multi-level data symbols have been transmitted to the DTV receiver. Decision-error feedback methods can then be used for correcting the filter coefficients for the adaptive filtering.

Designs are possible in which the PN1023 functions are extended with null samples to respective signals consisting of samples an integer power two in number, each of which extended signals has a duration equal to the same integer multiple at least two of 1024 symbol epochs. The DFTs of these extended PN1023 functions can then be differentially combined to generate the DFT of a deconvolution result. This DFT can be inverse-transformed to obtain the deconvolution result, which characterizes the transmission/reception channel.

Designs are also possible in which the PN1023 functions are extended by repetition and additional null samples to respective signals consisting of samples an integer power of two in number, each of which extended signals has a duration equal to the same integer multiple at least two of 1024 symbol epochs. The DFTs of these extended PN1023 functions can then be differentially combined to generate the DFT of a deconvolution result. This DFT can be inverse-transformed to obtain the deconvolution result, which is the cepstrum that characterizes the transmission/reception channel.

These approximations to deconvolution tend to have noisy measurements of further-advanced pre-echoes and noisy measurements of further-delayed post-echoes. Because of the orthonormality of the PN1023 functions, practical designs for initializing the filter coefficients exist that use cross-correlation of the PN1023 functions in the DFT domain, rather than their de-convolution, better to avoid noisy measurements of further-advanced pre-echoes and noisy measurements of further-delayed post-echoes. In these designs a number N of successive cycles of the 1023-symbol-epoch portion of digitized baseband DTV signal as selected to the dedicated computer 44 by the gating circuitry 43 is padded with consecutive null samples when looping it for subsequent DFT calculation. These null samples extend the successive cycles of that 1023-symbol-epoch portion to generate a first signal consisting of samples an integer power of two in number, the DFT of which is computed as a first DFT. A number M of successive cycles of the Nyquist-filtered PN1023 sequence form a block of samples that is reversed in temporal order and padded with consecutive null samples to generate a second signal consisting of samples the same integer-power-of-two in number, the DFT of which is computed as a second DFT. The first and second DFTs are convolved to generate a third DFT The inverse-DFT of this third DFT is descriptive of the cross-correlation of the Nyquist-filtered PN1023 sequence as actually received with the Nyquist-filtered PN1023 sequence as known to have been transmitted. If M and N differ, the wrap-around portions of the third DFT do not overlap. So, if M and N differ, the inverse-DFT does not intermingle post-echo and pre-echo components of different cycles of repetitive PN1023 sequence that are not contiguous in time.

J. D. McDonald has investigated results obtainable from padding two successive cycles of the 1023-symbol-epoch portion of the digitized baseband DTV signal selected by the gating circuitry 43 with null samples, to extend duration of the complete signal to 2048 symbol epochs. The DFT of this modular signal was convolved with the DFT of a second signal formed by extending to 2048 symbol epochs a single cycle of Nyquist-filtered PN1023 sequence arranged in proper temporal order, the extension being made with null samples. Initial filter coefficients calculated from the result of inverse-DFT of the convolution result sufficed to open the eye characteristic of the DTV signal sufficiently to be able to generate viable estimates of which multi-level data symbols have been transmitted to the DTV receiver. Larger values of M and N will improve the accuracy of the initial filter coefficients.

Figure 6:
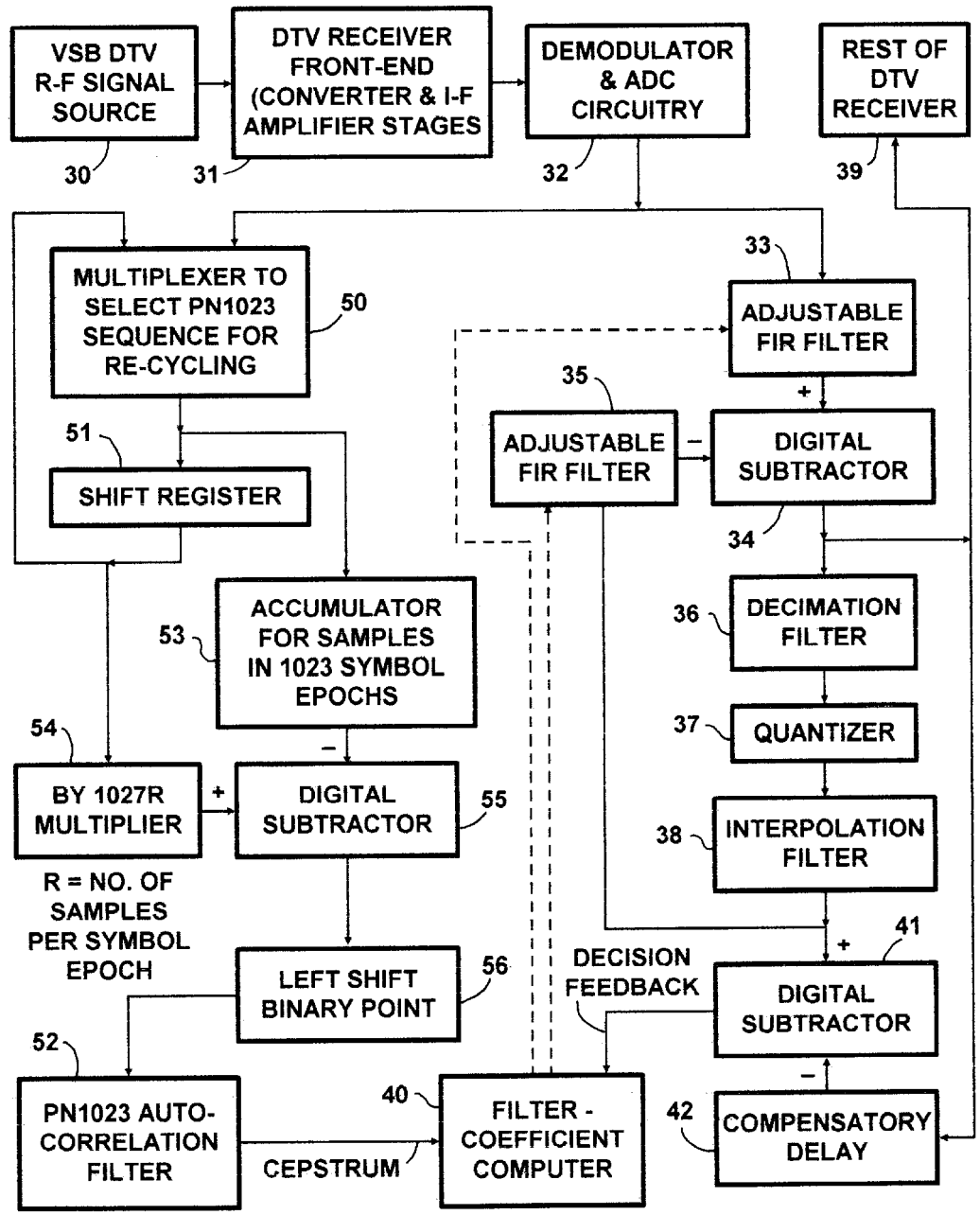
FIG. 6 is a schematic diagram of a portion of another receiver for broadcast digital television signals, which receiver portion includes an adaptive filter for providing channel-equalization and echo-suppression at baseband, and which receiver portion in accordance with a further aspect of the invention includes structure capable of utilizing the signal of FIGS. 3A, 3B, 3C, 3D, 3E, 3F, 3G, 3H, 3I, 3J, 3K and 3L in auto-correlation filtering precedes used in calculating weighting coefficients for the adaptive filter.

FIG. 6 shows another receiver for broadcast DTV signals capable of utilizing the preferred repetitive-PN1023 signal of FIGS. 3B, 3C, 3D, 3E, 3H, 3I, 3J, and 3K. The computers 44 and 49 the subtractor 46, and the ROMs 45, 47 and 48 included in the FIG. 5 DTV receiver and connected to form apparatus for computing the cepstrum using DFT are not included in the FIG. 6 DTV receiver. Instead, the cepstrum is generated using a PN1023 auto-correlation filtering technique.

A time-division multiplexer 50 is connected and operated so as to reproduce as its output signal either input signal received from a shift register 51 or input signal received from the demodulator and analog-to-digital conversion circuitry 32. The multiplexer 50 selects a 1023-symbol-epoch portion of the digitized baseband DTV signal that the demodulator and analog-to-digital conversion circuitry 32 supplies with appropriate band-shaping including Nyquist-slope filtering. The selected portion of the digitized baseband DTV signal is then looped back on itself to form an extended signal to be subjected to PN1023 auto-correlation filtering. The multiplexer 50 selects this 1023-symbol-epoch portion from the $312^{th}$ and $313^{th}$ data segments of each data field so as to occur after the disappearance of the longest delayed post-echo of the data in the $310^{th}$ segment, but before the appearance of the earliest pre-echo of the DFS signal in the initial data segment of the succeeding data field. This selection is analogous to the selection of a 1023-symbol-epoch portion of the digitized baseband DTV signal that the gating circuitry 43 performs in the FIG. 5 DTV receiver. The 1023-symbol-epoch portion of the digitized baseband DTV signal that the multiplexer 50 selects from the $312^{th}$ and $313^{th}$ data segments of each data field is reproduced in its output signal applied to the 1023-stage shift register 51 as shift input signal. After the multiplexer 50 selects the 1023-symbol-epoch portion of the digitized baseband DTV signal for application to the shift register 51 as shift input signal, the shift output signal from the shift rester 51 is selected by the multiplexer 50 for reproduction in its own output signal applied to the shift register 51 as shift input signal. Accordingly, after a 1023-symbol-epoch delay the shift register 51 reproduces in its shift output signal the 1023-symbol-epoch portion of the digitized baseband DTV signal previously selected by the multiplexer 50. The shift register 51 continues to reproduce that 1023-symbol-epoch portion over and over again in its shift output signal until such time a data field later that the multiplexer 50 next selects another 1023-symbol-epoch portion of the digitized baseband DTV signal.

The cyclically repeating PN1023 sequence and its attendant echo information that stream from the shift register 51 as shift output signal are filtered to remove an accompanying direct component that results from the synchronous demodulation of the pilot carrier signal in the demodulator and analog-to-digital conversion circuitry 32. After the accompanying direct component is removed, the cyclically repeating PN1023 sequence and its attendant echo information are supplied as input signal to a PN1023 auto-correlation match filter 52. The PN1023 match filter 52 responds to supply cepstrum signal to the filter-coefficient computer 40, which generates a set of weighting coefficients for the adaptive filtering therefrom. The set of weighting coefficients first generated after the DTV receiver is energized or after the DTV receiver tunes to receive a different channel is used to initialize the coefficients of the adaptive filtering. Thereafter, the computer 40 adapts the weighting coefficients incrementally using decision-feedback technique. Each time a new set of weighting coefficients is generated from the ECR signal extracted from the final data segments of a new data field, the computer 40 compares that set to the set of weighting coefficients as adjusted using decision-feedback technique. When the comparison indicates the set of weighting coefficients as adjusted using decision-feedback technique is in error, the adaptive filtering coefficients are re-initialized using the set of weighting coefficients most recently generated from the ECR signal.

There are a number of ways to remove the direct component accompanying the shift output signal from the shift register 51, so as to furnish only cyclically repeating PN1023 sequence and its attendant echo information as input signal to the PN1023 match filter 52. FIG. 6 shows the multiplexer 50 output signal applied to the shift register 51 as shift input signal also being applied as input signal to an accumulator 53 which accumulates the samples in the 1023-symbol-epoch portion of the digital baseband DTV signal the multiplexer 50 selects each data field from the demodulator and analog-to-digital conversion circuitry 32. The shift output signal, from the shift register 51 is supplied as multiplicand signal to a digital multiplier 54 for multiplication by a fixed multiplier signal equal to R times 1027, R being the number of samples per symbol epoch in the digital baseband DTV signal. Since multiplication is by a fixed multiplier, the digital multiplier 54 is best realized in read-only memory addressed by the shift output signal from the shift register 51, there being very little latency in the generation of product signal. A digital subtractor 55 receives this product signal as its minuend input signal and receives as its subtrahend input signal the output signal from the accumulator 53. There is a left shift 56 of binary point in the connection applying the difference output signal from the digital subtractor 55 to the PN1023 match filter 52 as its input signal.

This suppression of the pedestal component of digitized baseband DTV signal arising from synchronous detection of the pilot carrier is of particular interest, since the technique is very different from that used to suppress the pedestal of GCR signals in NTSC analog television. The technique of pedestal-suppression used in the FIG. 6 DTV receiver avoids the need for differentially combining oppositely poled PN sequences from successive fields to eliminate the direct pedestal component. In principle the 1023R samples in a PN1023 sequence are averaged to determine the direct component of those samples, which is then differentially combined with those samples before their application to the PN1023 match filter 52 as its input signal. The multiplier R is the number of samples per symbol epoch. Since it is the scaling of the echoes to the principal signal that is primarily the information of interest in echo measurement, rather than the absolute levels of these signals, the pedestal-suppression filtering shown in FIG. 6 is configured to avoid the division by 1023R that is required for straightforward averaging of the 1023R samples in a PN1023 sequence.

The accumulator 53 will have as a component of its response a term 1023R times as larger the direct component in each of the 1023R samples in the one cycle of the PN1023 sequence selected by the multiplexer 50, which direct component arises from synchronous detection of pilot carrier that ideally has a 1.25 normalized modulation level. The accumulator 53 will have as another component of its response a term arising from the fact that the P1023 sequence has one more symbol with one of the normalized modulation levels +5 and −5 than with the other normalized modulation level. This other component of the accumulator 53 response will approach a level 4R times as large as the direct component in each of the 1023R samples in the one cycle of the PN1023. In the FIG. 6 DTV receiver this other component of the accumulator 53 response is presumed to be the same polarity as the direct component that arises from synchronous detection of pilot carrier. That is the single cycle of repetitive-PN1023 sequence selected by the multiplexer 50 presumably has 512 symbols with +5 modulation level but only 511 symbols with −5 modulation level. So the total accumulator 53 response at the end of the accumulation period spanning one cycle of PN1023 sequence will approach a value 1027R times as large as the direct component in each of the 1023R samples in the one cycle of that sequence. The digital subtractor 55 receives as its minuend input signal the samples of the shift output signal from the shift register 51 response multiplied by the constant factor essentially equal to 1027R. The digital subtractor 55 receives as its subtrahend input signal the accumulator 53 output signal having a value essentially 1027R times as large as the direct component in each of the 1023R samples in the one cycle of PN1023 sequence. The digital subtractor 55 responds to these minuend and subtrahend input signals with a difference output signal that corresponds to the shift output signal from the shift register 51 response multiplied by the constant factor essentially equal to 1027R, but has substantially no accompanying direct pedestal term. The connection 56 shifts the binary point of this difference output signal several binary places to the left to divide it by a factor close to 1027R. The less significant bits of each resulting quotient sample can be discarded before applying it to the PN1023 auto-correlation filter 52 as input signal thereto. Such round-off procedure reduces the bitswidth requirement of digital delay stages used in constructing the PN1023 match filter 52.

Owing to signal transitions being affected by the limited bandwidth of the receiver, the level of the component of the accumulator 53 response caused by the PN1023 sequence presumably having 512 symbols with +5 modulation level but only 511symbols with −5 modulation level may be slightly less than 4R times as large as the direct component in each of the 511R samples in the one cycle of the PN1023 sequence. This can be compensated for by slightly changing the constant by which the digital multiplier 54 multiplies the samples of the shift output signal from the shift register 51.

The PN1023 auto-correlation match filter 52 is a finite-impulse-response (FIR) digital filter, with kernel coefficients corresponding to the PN1023. That is, presuming the sample rate to be a multiple of the baud rate, the kernel coefficient is +1 for samples occurring during a modulation level of +5 in a particular phase of the PN1023 sequence and is −1 for samples occurring during a modulation level of −5 in that particular phase of the PN1023 sequence. Accordingly, the PN1023 auto-correlation match filter 52 can be constructed from a chain of clocked digital adders and subtractors, presuming the sample rate to be a multiple of the baud rate. If the sample rate is not a multiple of the baud rate, the match filter will require digital multipliers in its construction. The weighting coefficients are defined by the particular phase of the PN1023 sequence subjected to raised-root-cosine low-pass filtering with roll-off at 5.38 MHz.

This alternative construction can also be employed even if the sample rate is a multiple of the baud rate and may provide slightly more accurate echo-location information because intersymbol interference is suppressed. However, the strong auto-correlation of a PN sequence tends to forestall problems from intersymbol interference.

Modification of the FIG. 6 DTV receiver to accommodate the single cycle of repetitive PN1023 sequence selected by the multiplexer 50 having 512 symbols with −5 modulation level but only 511 symbols with +5 modulation level is done by replacing the digital multiplier 54 having a fixed multiplier signal of 1027R with a digital multiplier having a fixed multiplier signal of 1019R.

The inventors currently prefer the FIG. 6 DTV receiver and its variants over the FIG. 5 DTV receiver and its variants. Since the FIG. 6 DTV receiver and its variants do rot require DFT computations to characterize the transmission/reception channel, these DTV receivers avoid the need for resampling the repetitive-PN-1023 sequences in order to expedite DFT computations. This results in a considerable saving in computations. The repetitive-PN-sequence matched filtering employed in the FIG. 6 DTV receiver and its variants is readily implemented with simple temporary-storage registers and tree-addition circuitry, with no need for complex digital multiplier structures.

Figure 7:
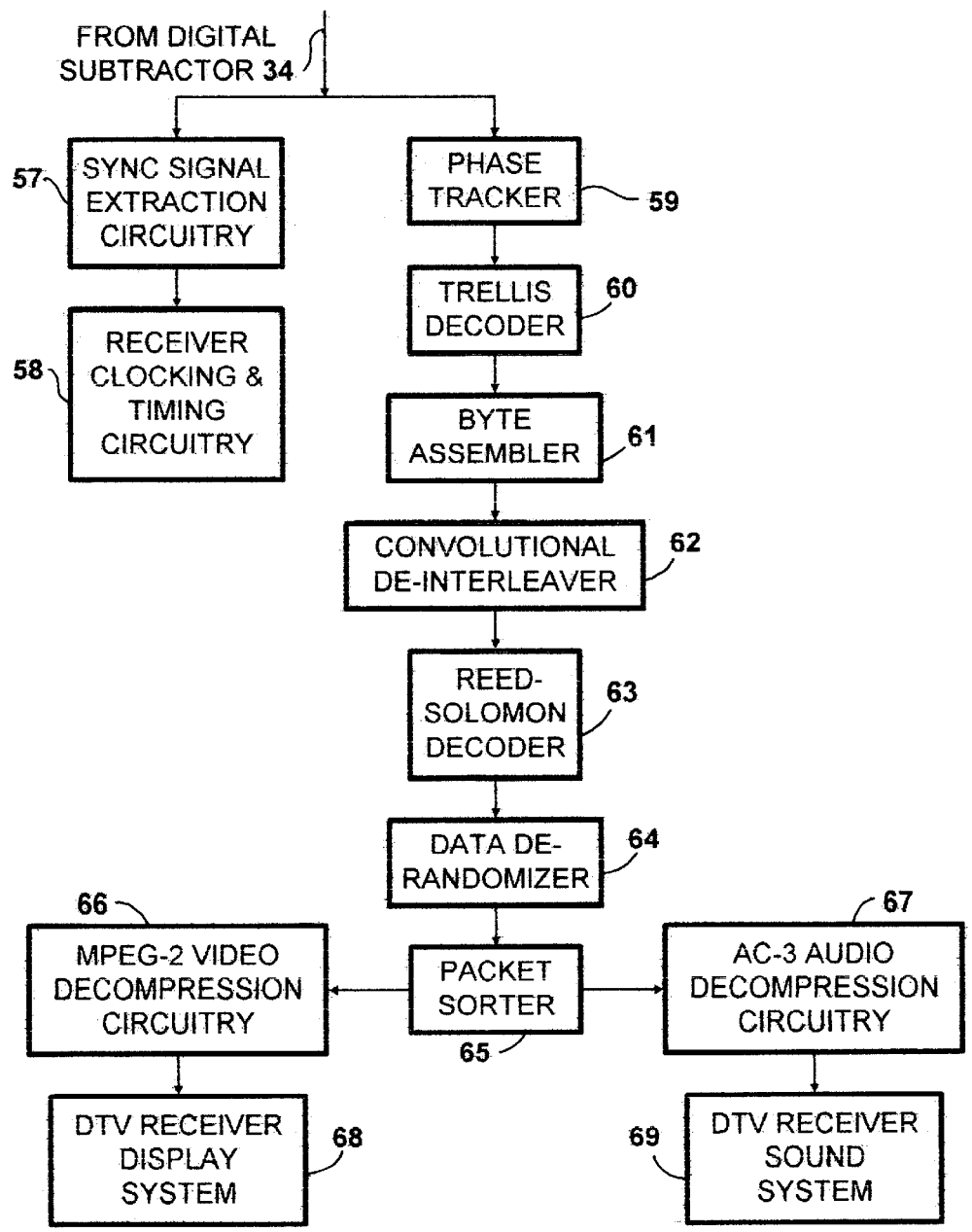
FIG. 7 is a schematic diagram of a further portion of a receiver for broadcast digital television signals, as may follow the portion of the receiver shown in either of the FIGS. 5 and 6.

FIG. 7 shows in greater detail the rest 39 of the DTV receiver, shown as a single block in the block schematic diagrams of FIGS. 5 and 6. For the most part, the rest 39 of the DTV receiver is of conventional design.

Synchronization signal extraction circuitry 57 is connected to receive equalized digital baseband signal from the digital subtractor 34. The sync signal extraction circuitry 57 extracts synchronization information from the equalized digital baseband signal and supplies the synchronization information to receiver clocking and timing circuitry 58. By way of example, the synchronization signal extraction circuitry 57 includes a narrowband bandpass filter for extracting 5.38 MHz component from the equalized digital baseband signal supplied from the digital subtractor 34. The narrowband bandpass filter response is squared, and the 10.76 MHz component resulting from the squaring procedure is used as a reference for developing an automatic frequency and phase control for a master clock oscillator. This master clock oscillator (not explicitly showning in FIG. 7) is included in the receiver clocking and timing circuitry 58 for clocking the receiver operation at multiples of baud rate.

The receiver clocking and timing circuitry 58 usually includes counter circuitry for controlling receiver operation throughout each data frame. This counter circuitry (not explicitly shown in FIG. 7) counts oscillations of the master clock oscillator, and the count output signals are synchronized to the data frame by signals that the sync signal extraction circuitry 57 extracts from the equalized digital baseband signal supplied from the digital subtractor 34. The counter circuitry typically includes a counter for counting oscillations of the master clock oscillator to generate a count descriptive of the number of symbols per data segment. This counter is reset so its count is initialized at the beginning of each data segment. This resetting is done in response to circuitry for detecting the occurrence of data segment synchronization (DSS) signals, which circuitry (not explicitly shown in FIG. 7) is included in the sync signal extraction circuitry 57. The circuitry for detecting DSS signals can be of the type described in U.S. Pat. No. 5,594,506 issued 14 Jan. 1997 to J. Yang and titled "LINE SYNC DETECTOR FOR DIGITAL TELEVISION RECEIVER". The counter circuitry in the receiver clocking and timing circuitry 58 typically includes a data segment counter, which counts the DSS signals that are detected. During its normal operation the data segment counter rolls over to initial condition during the initial data segment of each data field, and the data segment counter is to be reset to initial condition during the initial data segment of each data field should rollover not occur. To implement the resetting the sync signal extraction circuitry 57 includes a match filter (not explicitly shown in FIG. 7) that detects the occurrence of the PN511 sequence in the initial data segment each data field. The pulse output of the match filter to the occurrence of the PN511 sequence in the initial data segment of a data field is used to reset the data segment counter to its initial condition.

Symbol synchronizer or phase tracker 59 is connected to receive equalized digital baseband signal from the digital subtractor 34 and to supply its response to a trellis decoder 60, which typically is of 12-phase design as described in ATSC Document A/54, Section 10.2.3.9. The trellis decoder is disabled during the data segments added to each data field for containing the repetitive-PN1023 training signal, as well as during the first data segment of each data field. The symbol synchronization of phase tracker 59 can be of the design described in ATSC Document A/54, Section 10.2.3.8, including a further decision-feedback loop for suppressing phase noise from the equalized digital baseband signal supplied to the trellis decoder 60. When the DTV signal is not trellis-coded, the trellis decoder 60 is replaced by a suitable symbol decoder of different type, of course. For examples DTV transmissions may be 2-VSB signals without trellis coding.

The trellis decoder 60 (or alternative symbol decoder) is connected for delivering symbol decoding results to a byte assembler 61, which assembles the symbol decoding results into 8-bit bytes for application to a convolutional de-interleaver 62. Convolutional de-interleaver 62 reverses the convolutional interleaving introduced by the convolutional interleaver 06 in the FIG. 4 transmitter. The convolutional de-interleaver 62 is operated somewhat differently than in an A/53 DTV receiver. The operation of the convolutional de-interleaver 62 skips over the data segments added to the data field for containing the repetitive-PN1023 training signal as well as skipping over the first data segment.

A Reed-Solomon decoder 63 is connected to receive the de-interleaved data from the convolutional de-interleaver 62. The Reed-Solomon decoder 63 responds to the Reed-Solomon forward-error-correction coding contained in that de-interleaved data to correct burst errors of less than a specified number of bytes and to detect errors of longer duration than be corrected. Error detection and correction is done on that interleaved data before its application to a data de-randomizer 64 so that the data de-randomizer 64 is better able to reproduce the packetized data supplied from the packet assembler 02 to the data randomizer 03 in the FIG. 4 transmitter. The data de-randomizer 64 exclusive-ORs the error-corrected de-interleaved data with a prescribed de-randomizing signal data to reproduce packetized data supplied to a packet sorter 65, which sorts packets responsive to their header information.

The packet sorter 65 is also called the "transport-stream de-multiplexer". The packet sorter 65 selects packets containing compressed video information for application to MPEG-2 video decompression circuitry 66 and selects packets containing compressed audio information for application to AC-3 audio decompression circuitry 67. In a complete DTV receiver system the MPEC-2 video decompression circuitry 66 forwards de-compressed video signals to the DTV receiver display system 68; and the AC-3 audio decompression circuitry 67 forwards de-compressed audio signals to the DTV receiver sound system 69.

Besides the trellis decoder 60 and the convolutional de-interleaver 62 having to be clocked somewhat differently to confine their operations to the $2^{nd}$ through $313^{th}$ data segments of each data field, there is a further way in which the operation of the rest 39 of the DTV receiver is affected to some extent. During the $2^{nd}$ through $313^{th}$ data segments estimates of the symbols transmitted to the DTV receiver, which the filter-coefficients computer 40 uses for adapting the coefficients of the FIR filters 33 and 35 on a tracking basis, are extracted-from symbol decoding results generated by the trellis decoder 60 or by another symbol decoder. Customarily, the estimates of the first 700 symbols following the DSS sequence in the first data segment are not extracted from symbol decoding results from the trellis decoder 60 or from another symbol decoder, but instead are read from read-only memory within the computer 40. The higher confidence level in the estimates supplied from ROM facilitates reduction of tracking error. The addressing for this ROM is generated within the receiver clocking and timing circuitry 58. When extra data segments containing repetitive-PN1023 training signal are appended to each data field, the addressable locations in the ROM can be increased for storing high-confidence estimates of the symbols in these extra data segments. The receiver clocking and timing circuitry 58 is modified for generating the additional addressing for the increased ROM.

The foregoing specification describes, with reference to FIGS. 5 and 6 of the drawing, DTV receivers in which the adaptive filter provides for channel equalization and echo cancellation at baseband using fractional equalization of real signals. Other DTV receivers, which embody the invention in others of its aspects, use adaptive filters providing equalization of complex signals. Such equalization can be easily carried out using baud-rate samples there is less need for oversampling if equalization is performed on complex signals. In still other DTV receivers, which can be modified for embodying the invention in others of its aspects, I-F DTV signal is digitized for application to an adaptive filter that provides for channel equalization and echo cancellation in the I-F passband. The adaptive filter response is then demodulated to obtain baseband signals for application to the trellis decoding apparatus. Through acquaintance with this specification and its drawing, one skilled in the art of equalizer design will be enabled to adapt the invention for use in many known adaptive filtering schemes used for channel equalization and echo suppression.

The operational procedures of the computer 40 in the FIG. 5 or FIG. 6 DTV receiver can take a variety of forms known in the art. The cepstrum provided to the computer 40 from the computer 49 in the FIG. 5 DTV receiver and from the PN1023 auto-correlation filter 52 in the FIG. 6 DTV receiver will be used differently in these various ways of operating the computer 40. The cepstrum of the required time-domain filter that the computer 49 in the FIG. 5 DTV receiver or the PN1023 auto-correlation filter 52 in the FIG. 6 DTV receiver supplies is a "snapshot" of what the effective overall kernel of the adaptive filter should be at the beginning of the "motion picture" of the change in the kernel that is to take place when tracking dynamic multipath variation. This prides a basis for greatly simplifying the tasks to be performed by the computer 40.

This is especially so because much of dynamic multipath distortion is continuous in nature, with very little change in transmission/reception channel characteristic occurring from each symbol epoch to the next. Accordingly, the initial adaptive filtering coefficients determined from the ECR signal afford a basis from which tracking procedures based on decision feedback methods do not have to hunt much for convergence before beginning the tracking of the changes in channel characteristic resulting from incrementally changing multipath distortion. One exception to dynamic multipath-distortion being continuous in nature is the well-known suddenly-revealed-ray exception in which a path closed off to reception is abruptly opened for reception. Another exception is the well-known suddenly-masked-ray exception in which a path open for reception is abruptly closed to reception Tracking of dynamic multipath by the adaptive filtering is disrupted when either of these exceptions occurs, and rapid re-initialization of the adaptive filtering coefficients directly becomes the immediate concern. The determination of the initial adaptive filtering coefficients directly from the ECR signal without relying on decision feedback assures that reception can be restored within less than about 25 milliseconds whenever either one of these exceptions occurs.

There are a number of methods for determining whether such an exception remains uncorrected for at the end of a data field. One method compares the weighting coefficients of the adaptive filtering at the conclusion of the data field, as they have been adjusted by decision feedback, with the weighting coefficients of the adaptive filtering as calculated from the repetitive-PN1023 sequence. Substantial discrepancies between the two sets of coefficients is evidence that dynamic multipath distortion exhibited a severe discontinuity in the previous data field, which has not been corrected for, and that the adaptive filtering preferably should proceed with the weighting coefficients calculated from the repetitive-PN1023 sequence. In another method for determining whether dynamic multipath distortion exhibited a severe discontinuity that has not been corrected for at the end of a data field, the magnitudes of decision-feedback error samples near the conclusion of each data field are measured, and the measured are averaged. A high average is evidence that dynamic multipath distortion exhibited a severe discontinuity in the previous data field, which has not been corrected for, and that the adaptive filtering preferably should proceed with the weighting coefficients calculated from the repetitive-PN1023 sequence.

In many of the various ways of operating the computer 40, an initial consideration in evaluating the cepstrum is determining what will be considered the principal or "cursor" component of the received DTV signal when multipath reception obtains. This cursor component is used as a reference for determining whether each other component of the received DTV signal when multipath reception obtains, as differentially delayed with respect to the cursor component, is to be considered pre-echo or a post-echo. Each later-arriving component of the received DTV signal is considered to be a "post-echo", and its arrival time is measured relative to that of this cursor component, being typically measured as a positive delay (or alternatively as a negative advance) Each earlier-arriving component of the received DTV signal is considered as a "pre-echo", and its arrival time is measured relative to that of this cursor component, being typically measured as a negative delay (or alternatively as a positive advance).

In some operational procedures for the computer 40, the largest of the differentially-delayed components of the received DTV signal is chosen as the cursor component. This procedure admits the existence of pre-echoes of substantial energy preceding the cursor component. The existence of pre-echoes of substantial energy increases the kernel width needed in the FIR filter 33 to accommodate the most advanced of these pre-echoes. Furthermore, the suppression of echoes in the feed-forward FIR filter 33 is accomplished by weighted summation of samples of signal that have not been subjected to echo-suppression. This contrasts with the suppression of echoes by the IIR filter including the feedback FIR 35, which is accomplished by weighted summation of samples of signal that have been subjected to echo-suppression. The suppression of echoes by the IIR filter suppresses the echo components without introducing additional echo components. The suppression of echoes by the feed-forward FIR filter 33 results in the introduction of echo repeat components with twice the differential delay respective to the cursor component of signal, which echo repeat components are reduced in amplitude compared to the original echo components suppressed in the feed-forward FIR filter 33 response. The reduction in amplitude of these singly-repeated echo repeat components is substantial for a transmission/reception channel in which the cursor component of the cepstrum is substantially larger than the other components. The reduction is usually sufficient that these echo repeat components are lost in the digital signal quantization. For a transmission/reception channel in which the cursor component of the cepstrum is not substantially larger than the other components, however, the singly-repeated echo repeat components have substantial amplitude, and even multiply-repeated echo repeat components will in some instances have substantial amplitude.

The echo repeat components that are post-echoes can be cancelled by the IIR filter cascaded with the feed-forward FIR filter 33 when the decision-feedback method takes over. So the FIR filter 33 kernel need not extend enough in the time-lag direction to provide capability for suppressing post-echo repeats that can be cancelled in the IIR filter. The IIR filter has no capability for canceling or suppressing echo repeat components that are pre-echoes, however, so the FIR filter 33 kernel width needs to extend far enough in the time-advance direction to provide capability for reducing the amplitudes of all repeats of these pre-echoes to insignificant values when the decision-feedback method takes over, so that these pre-echo repeats will be lost in the digital signal quantization.

In alternative operational procedures for the computer 40, one of the earlier received differentially-delayed DTV signals having significant energy is chosen as the cursor component. This procedure can eliminate pre-echoes of substantial energy preceding the cursor DTV signal and so reduce the kernel width needed in the FIR filter 33. However, unless the received DTV signal that is chosen as cursor component is substantially as strong as the strongest received DTV signal component the C/N of the adaptive filtering response is substantially lowered from what it would be were the strongest received DTV signal component chosen as cursor component. It is generally preferable that the DTV receiver be designed to choose the strongest received DTV signal component as cursor component when the received DTV signals are accompanied by substantial noise. The availability of the cepstrum generated film one cycle of the repetitive-PN1023 sequence provides information that can provide a basis for deciding which of the received DTV signal components is best chosen as cursor component.

It is desirable to avoid changing cursor component during a data field because of the latency of samples within the adaptive filtering. The availability of the cepstrum of the time-domain filter at the conclusion of each DTV data field facilitates the computer 40 selecting one of the differentially-delayed components of the received DTV signal to be the cursor component for the entirety of the next data field. Under certain reception conditions a component chosen as cursor component may substantially decline in energy during a data field, which makes it desirable to select a component with greater energy as cursor component for the next data field. Such a substantial decline in energy is signaled by the decision-feedback procedure making large increase(s) in the filter coefficient(s) associated with the cursor component. The digital multipliers that the adaptive filters 33 and 35 use for weighting differentially delayed DTV signals must have sufficient dynamic range for accommodating weighting coefficients with amplitudes several times unity. Generally, it is preferable that, so long as the decision-feedback procedure exhibits reasonably small tracking errors, the computer 40 maintains the same cursor component from one data field to the next. So, the repetitive-PN1023 sequence is not used for generating a complete revision of the adaptive filter coefficients at the beginning of a data field provided that the decision-feedback procedure has been exhibiting reasonably small tracking errors.

However, if the decision-feedback procedure has been exhibiting reasonably small tracking errors, it is attractive to base estimates of transmitted signal during the final three data segments of each data field an the repetitive-PN1023 sequence as stored at the receiver, rather than from received DTV signal. This increases the confidence factor of the corrections the decision-feedback procedure generates during the repetitive-PN1023 sequence in the final three data segments of each data field, as well as during the PN511 sequence and the triple-PN63 sequence in the initial data segment of each data field. The higher confidence factor facilitates greater gain in the incremental corrections made to adaptive filtering coefficients during these times, improving tracking accuracy.

Many designs for a DTV receiver embodying the invention in certain of its aspects sill provide for temporal buffering between the various procedures for adapting the adaptive filtering used for channel-equalization and echo cancellation. The means providing for this temporal buffering are not explicitly shown in FIGS. 5 and 6; but are typically provided for by digital random-access memory (RAM). Of especial interest is a particular use of digital memory configured to introduce first-in-first-out (FIFO) buffering delay into the application of input signal supplied from the demodulator and ADC circuitry 32 to the feed-forward FIR filter 33. The FIFO buffering is made long enough to allow the time required for processing the repetitive-PN1023 sequence extracted from the circuitry 32 output signal, in order to generate initial weighting coefficients of the FIR filters 33 and 35, to transpire just before the $311^{th}$ data segment of the previous data field begins to be supplied from the interpolation filter 38 to the subtractor 41. Then, instead of the decision-feedback error signal being generated as the difference of the adaptive filtering response as supplied from the compensatory delay 41 from the response of the interpolation filter 38, as implied in FIGS. 5 and 6, decision-feedback error signal is generated as the difference of the adaptive filtering response as supplied from the compensatory delay 41 from the Nyquist-filter response to the repetitive-PN-1023 sequence, ensuing PN511 sequence and ensuing PN63 sequence(s) as known a priori at the DTV receiver. The high confidence factor of this alterative decision-feedback error signal facilitates greater gain in the incremental corrections made to adaptive filtering coefficients during these times, improving the speed of the decision-feedback adaptation in suppressing any coefficient error remnant after initialization.

Though not explicitly shown in FIGS. 5 and 6, in some designs for a DTV receiver embodying the invention in certain of its aspects there will be digital memory for buffering the application of incremental updates of the weighting coefficients of the FIR filters 33 and 35 to the coefficient registers of these filters, which incremental updates are generated by decision-feedback procedures. Such buffer memory facilitates the reversal-of-real-time calculations of those updates by a block-LMS algorithm, for example.

Though not explicitly shown in FIGS. 5 and 6, in some DTV receiver designs the means for temporal buffering will also include digital memory configured to introduce FIFO buffering delay into the application of difference output signal from the subtractor 34 to the rest 39 of the DTV receiver. Designs including such FIFO digital memory, the FIFO digital memory for controlling the application of input signal supplied from the circuitry 32 to the feed-forward FIR filter 33, and digital buffer memory for controlling the application of incremental updates to the weighting coefficients of the FIR filters 33 and 35 permit the adaptive filtering to be operated asynchronously with respect to the baud rate of received signal. For example, it is desirable to permit data-directed stochastic procedures for adapting the coefficients of the filters 33 and 35 to be clocked at increased rates if re-computations of weighting coefficients are necessitated when attempting to track dynamic echo components. The rate data is advanced through the adaptive filtering per se can be varied, even halted briefly at times, with the FIFO memories preceeding and succeeding the adaptive filtering per se generating an overall system function with uniform latency.

Rather than having the structure shown in FIGS. 5 and 6, the adaptive filtering could be constructed to use a single FIR filter for channel equalization and echo cancellation. By way of example, such an alternative is described in U.S. Pat. No. 5,648,987 issued 15, Jul. 1997 to J. Yang. C. B. Patel, T. Liu & A. L. R. Limberg, entitled "RAPID-UPDATE ADAPTIVE CHANNEL-EQUALIZATION FILTERING FOR DIGITAL RADIO RECEIVERS, SUCH AS HDTV RECEIVERS". Yang et alii use another FIR filter to implement a block-LMS algorithm for updating the coefficients of the adaptive FIR filter used for channel equalization and echo cancellation. If a single adaptive FIR filter were used for chancel equalization and echo cancellation, the kernel of that adaptive FIR filter at the time the "snapshot" is extracted could be approximated by the following procedure from the cepstrum of the required time-domain filter that the computer 49 in the FIG. 5 DTV receiver or the PN1023 auto-correlation filter 52 in the FIG. 6 DTV receiver. All components of the cepstrum except that selected to be the "cursor", occurring at the time that the principal multipath component of the DTV signal is considered to be received, would have their polarity changed with respect to the cursor. This approximation method works reasonably satisfactorily for a Ricean transmission/reception channel, for which the cursor component of the cepstrum is substantially larger than the other components and for which echoes exhibit short differential delay from the cursor component as compared to the kernel width of the FIR filter. However, this approximation method is inaccurate when several components have energy that is several percent of the energy of the cursor component. If the adaptive filtering is to correct for such a transmission/reception channel, the filter characteristic that convolves with the cepstrum to result in a Nyquist channel response is better computed by more exact means. The adaptive filtering weighting coefficients are normalized, so the dynamic range of the adaptive filtering response is suitable for input signal to the quantizer 37.

Using a single FIR filter for channel equalization and cancellation of all echoes including the longer-delayed post-echoes is not preferred actual practice. The transmission/ reception channel is theoretically modeled as a FIR filter with different weighting coefficients for the different propagation paths having different respective delays. In actual practice, this model is also correct under static multipath reception conditions. Equalization of the channel with regard to post-echoes can be exact if the adaptive filter has overall an infinite impulse response—i.e., a time-domain response with a very large number of coefficients lagging in time. The response of a single FIR filter used for channel equalization and cancellation of all echoes including the longer-delayed post-echoes tends to have a substantially smaller number of coefficients lagging in time, so the cancellation of the longer-delayed post-echoes is not optimal. This tendency arises from the practical design imperative to keep the latent delay through the single FIR filter no more than a few times the longest delayed post-echoes with significant energy. Accordingly, the exact system function for equalization of the channel with regard to post-echoes can only be approximated in a single-FIR-filter design even supposing the filter coefficients to be subsequently adapted by data-directed methods. The approximation procedure suppresses echoes, but undesirably generates repeats of the echoes. These repeats are attenuated respective to the suppressed echoes and exhibit differential delays respective to a cursor component of received DTV signal that are integer multiples of the suppressed echoes. Therefore, a larger number of non-zero weighting coefficients and therefore an undesirably increased number of digital multiplications are required in the single-FIR-filter design, as compared to a design using an IIR filter. Not only do more non-zero digital multiplications require more die area in an integrated-circuit design implementing them in hardware; they undesirably increase the effects on quantization noise and stochastic jitter. Accordingly, a adaptive filtering structure including an IIR section—e.g., of the type depicted in FIGS. 5 and 6—is preferable.

In the adaptive filtering structure of either FIG. 5 or 6, the kernel of the FIR filter 33 comprises a weighting coefficient at the "cursor" position corresponding to the time that the principal multipath component of the DTV signal is considered to be received. The filter 33 kernel further comprises a subset of coefficients corresponding to the portion of the cepstrum of the required time-domain filter preceding the "cursor" time that the principal multipath component of the DTV signal is received. The filter 33 kernel further comprises a subset of coefficients corresponding to the portion of the cepstrum that succeeds the "cursor" time by less delay than the minimum delay possible in the IIR filter containing the FIR filter 35 in feedback loop. DTV receiver designs are known that provide crossovers between the weighting coefficients of the feed-forward FIR filter 33 and the weighting coefficients in the feedback FIR filter 35 of the IIR filter cascaded after the filter 33. A rapid approximation method that works satisfactorily for a Ricean transmission/reception channel in which the cursor component of the cepstrum is substantially larger than the other components, generates the filter 33 kernel from a corresponding portion of the cepstrum by changing the polarity of all components of the cepstrum except the cursor component. The filter 35 kernel is generated from the longer-delayed portion of the cepstrum without polarity change. This approximation method is inaccurate when several components have energy that is several percent of the energy of the cursor component. If the adaptive filtering is to correct for such a transmission/ reception channel, the filter characteristic that convolves with the cepstrum to result in a Nyquist channel response must be computed by more exact means. The adaptive filtering weighting coefficients are normalized, so the dynamic range of the adaptive filtering response is suitable for input signal to the quantizer 37.

More accurate computation of the weighting coefficients of,the adaptive filtering proceeds from the observation that the time-domain response of the complete adaptive filtering structure should correspond to the cepstrum supplied by the computer 49 in the FIG. 5 DTV receiver or by the PN1023 auto-correlation filter 52 in the FIG. 6 DTV receiver. The time-domain response of the complete adaptive filtering structure results from the convolution of the time-domain responses of the FIR filter 33 and of the subsequent IIR filter containing the FIR fitter 35 in feedback loop. As part of the DTV receiver design process the adaptive filtering system characteristic that convolves with any cepstrum of specified length to result in a Nyquist channel response for the adaptive filter structure can be computed in general terms, using Z-transform polynomials. The algebraic equations resulting from such computations can be stored in the filter-coefficient computer 40 in the DTV receiver, for use in calculating adaptive filtering coefficients from the specfic cepstrum supplied by the computer 49 in the FIG. 5 DTV receiver or by the PN1023 auto-correlation filter 52 in the FIG. 6 DTV receiver. These algebraic equations define the adaptive filtering weighting coefficients in terms of the cepstrum values. The sub-programs employing these algebraic equations may also be employed in programs for implementing the decision-directed procedures for tracking dynamic multi distortion.

In the various ways of operating the computer 40, another important consideration in evaluating the cepstrum is determining how the gain of the adaptive filter is to be related to the energies of the component terms of the cepstrum. A normalization of the filter for principal DTV signal is always substantially the same no matter how its weighting coefficients are computed from the repetitive-PN1023-sequence ECR signal. The takeover of the tracking of multipath reception conditions by the decision-feedback procedures will not be smooth if immediately after the takeover the quantizer 37 is called upon to make substantial automatic adjustment of the decision levels used for quantizing its input signal to generate estimates of transmitted symbols. There is apt to be error in the estimates the quantizer 37 makes while those decision levels are being adjusted, and the decision-feedback procedures depend on these estimates being accurate most of the time in order to adjust accurately the weighting coefficients of the adaptive filtering. Normalization is done respective to the component of the cepstrum selected to be the cursor component, since this component is to be the only one that survives in the adaptive filtering response. In order that the C/N of the adaptive filtering response supplied to the quantizer 37 is substantially as good as it can be, the cursor component should be one of the higher energy components of the cepstrum, if not the highest energy one. In the FIG. 5 DTV receiver normalization is automatic providing that the DFT stored in the ROM 47 is that of a Nyquist-filtered PN1023 sequence of the correct "gain" respective to input signal for the quantizer 37.

Normalization is quite simple in the FIG. 6 DTV receiver, too. The cursor component is known to be the sum of 1023 symbol epochs of signal modulated with a standardized-amplitude modulation signal, so a reduction in gain of each cepstrum component by a factor of 1023 will reduce the cursor component to a unity-gain coefficient. These divisions could be closely approximated by shifting the binary point of each cepstrum component ten bit places in the direction of reducing the significance of the component. In practice, the ten-bit-place binary point shift may be taken into account elsewhere in the system.

FIG. 8A shows the cyclically repeating cepstrum of a signal received under multipath reception conditions, as that cepstrum is determined by the computer 49 in the FIG. 5 receiver portion or by the cyclic PN713 match filter 52 in the FIG. 6 receiver portion. The component 70 in each cycle is generated in response to the principal signal. The component 71 that precedes the component 70 in each cycle is generated in response to a pre-echo advanced by less than 47.5 microseconds, and the component 72 that succeeds the component 70 in each cycle is generated in response to a post-echo delayed by less than 47.5 microseconds.

The component 73 in each cycle is generated in response to a post-echo delayed by more than 47.5 microseconds, but less than 95 microseconds. The component 73, although generated in response to a post-echo precedes the component 70 in each cycle, owing to the wrap-around of DFT in the FIG. 5 receiver portion, or owing to the wrap-around of the cyclic PN713 match filter 52 in the FIG. 6 receiver portion. Unless the component 73 precedes the component 70 in each cycle sufficiently that it is known to be outside the range for pre-echoes, there is the possibility of it being mistaken for a pre-echo.

The component 74 in each cycle is generated in response to a post-echo delayed by more than 95 microseconds. Owing to the wrap-around of DFT in the FIG. 5 receiver portion, or owing to the wrap-around of the cyclic PN713 match filter 52 in the FIG. 6 receiver portion, the component 74 is apt to be confused with a post-echo with 95 microseconds less delay respective to the principal signal.

A DTV receiver can be designed presuming that post-echoes longer than 64 microseconds never have sufficient strength to cause data slicing errors so frequently that the error-correcting capability of the receiver is overwhelmed, and presuming that any component of the cepstrum that precedes the principal signal by no more 30 microseconds is attributable to a pre-echo. Such DTV receivers or minor variants thereof should work satisfactorily at most reception sites. If exceptionally long-delayed post-echoes are to be better distinguished from pre-echoes and from much less delayed post-echoes, cepstrum generated in the receiver portion of FIG. 5 or of FIG. 6 must be further analyzed, which further analysis can be performed using apparatus as described infra with reference to FIG. 9 of the drawing.

The filter coefficient computer 40 can start with a cyclically repeating cepstrum of the type shown in FIG. 8A and process it to generate an extended cepstrum in which many of the temporal aliases and repeats are suppressed. FIG. 8B shows the time-domain response of an initial step in such processing of the FIG. 8A cyclically repeating cepstrum, in which initial step the repeats of the component 70 generated in response to the principal signal are suppressed. FIG. 8C shows an intermediate step in the processing, in which intermediate step the wrap-arounds of the pre-echoes are suppressed FIG. 8D shows a final step in the processing, in which final step the wrap-arounds of the post-echoes are suppressed. The intermediate and final processing steps are described infra in more detail.

Figure 9:
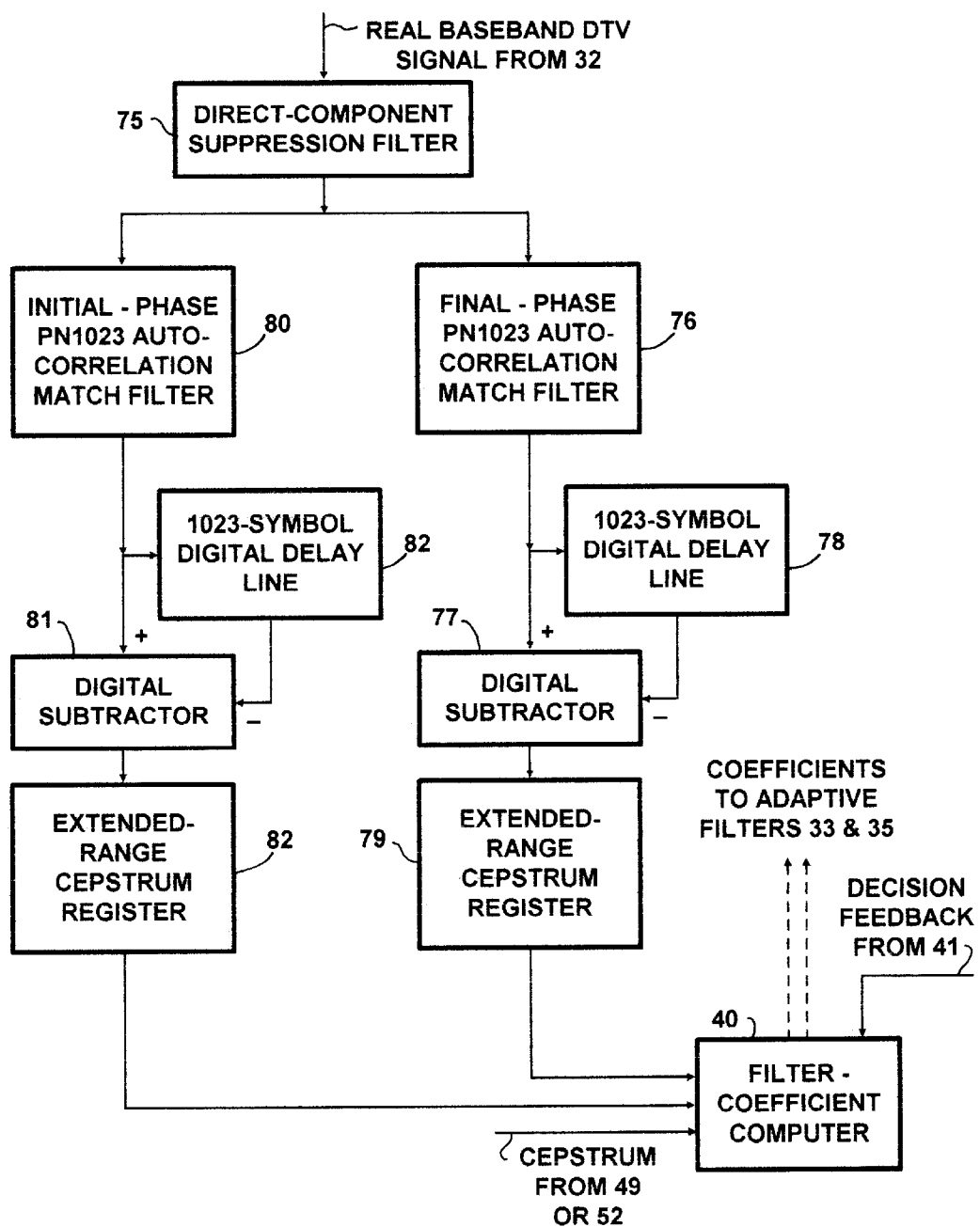
FIG. 9 is a block schematic diagram of apparatus that can be used in accordance with an aspect of the invention for further analyzing the cepstrum of the received DTV signal.

FIG. 9 shows apparatus that can be used for further analyzing the cepstrum of the DTV signal as received and demodulated, for implementing the intermediate and final processing steps that generate the time-domain responses of FIGS. 8C and 8D. The input signal to the FIG. 9 apparatus is demodulated real-only baseband DTV signal from the demodulator and analog-to-digital conversion circuitry 32 of the FIG. 5 or FIG. 6 receiver portion, supplied as input signal to a direct-component suppression filter 75. The filter 75 may, for example, be of a type that generates its response by subtracting a many-symbol-epochs average of the real-only baseband DTV signal from itself. Alternatively, by way of further example, the filter 75 may be of a type that performs a digital differentiation on the real-only baseband DTV signal and then performs a digital integration on the digitally differentiated real-only baseband DTV signal to recover the real-only baseband DTV signal without accompanying direct component.

A digital filter 76 is connected to receive, as its input signal, the response of the direct-component suppression filter 75. The digital filter 76 has a kernel corresponding to the final 1023 symbols of the repetitive-PN1023 sequence used as training signal for the adaptive filtering used for channel equalization and echo suppression. The digital filter 76 functions as an auto-correlation match filter for the final-phase PN1023 sequence beginning the repetitive-PN1023 sequence and generates a response that contains a repeated cepstrum of the reception channel. The response of the digital filter 76 is applied without delay as subtrahend input signal to a digital subtractor 77 and as input signal to a digital delay line 78 that responds to its input signal with 1023 symbol epochs delay. The response of the digital delay line 78 is applied without delay as minuend input signal to the digital subtractor 77. The subtractor 77 and the delay line 78 form a comb filter that responds to the repeated cepstrum of the reception channel to generate a cepstrum of the reception channel preceded some time earlier by the negative of that cepstrum. The later-in-time cepstrum in the digital subtractor 77 difference signal is written into an extended-range cepstrum register 79 for temporary storage. The filter-coefficient computer 40 is connected for reading the contents of the extended-range cepstrum register 79 and for correcting those contents. The register 79 contents are overwritten when the repetitive-PN1023-sequence training signal next occurs.

A digital filter 80 is connected-to receive, as it input signal, the response of the direct-component suppression filter 75. The digital filter 80 has a kernel corresponding to the initial 1023 symbols of the repetitive-PN1023 sequence used training signal for the adaptive filtering used for channel equalization and echo suppression. The digital filter 80 functions as an auto-correlation match filter for the initial-phase PN1023 sequence concluding the repetitive-PN1023 sequence and generates a response that contains a repeated cepstrum of the reception channel. The response of the digital filter 80 is applied without delay as minuend input signal to a digital subtractor 81 and as input signal to a digital delay line 82 that responds to its input signal with 1023 symbol epochs delay. The response of the digital delay line 82 is applied without delay as subtrahend input signal to the digital subtractor 81. The subtractor 81 and the delay line 82 form a comb filter that responds to the repeated cepstrum of the reception channel to generate a cepstrum of the reception channel succeeded some time later by the negative of that cepstrum. The earlier-time cepstrum in the digital subtractor 81 difference signal is written into an extended-range cepstrum register 83 for temporary storage. The filter-coefficient computer 40 is connected for reading the contents of the extended-range cepstrum register 83 and for correcting those contents. The register 83 contents are overwritten when the repetitive-PN1023-sequence training signal next occurs.

Figure 10D:
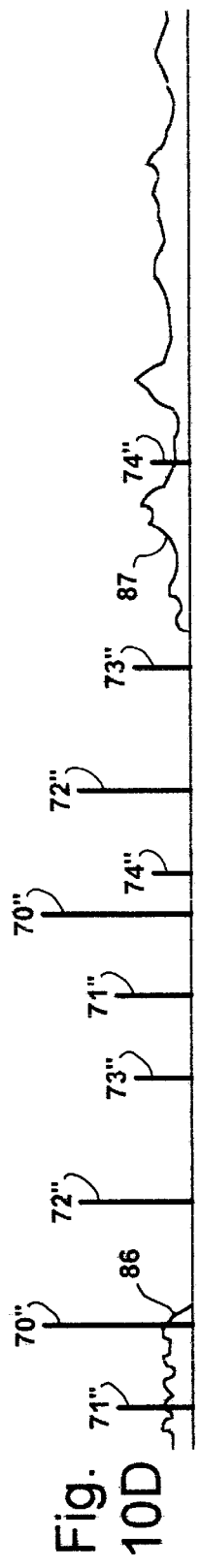
FIGS. 10D, 10E and 10F are graphs, versus the same time abscissa, of time-domain responses at points in additional circuitry in the FIG. 9 apparatus used for further analyzing the post-echo portion of the cepstrum.
Figure 10E:
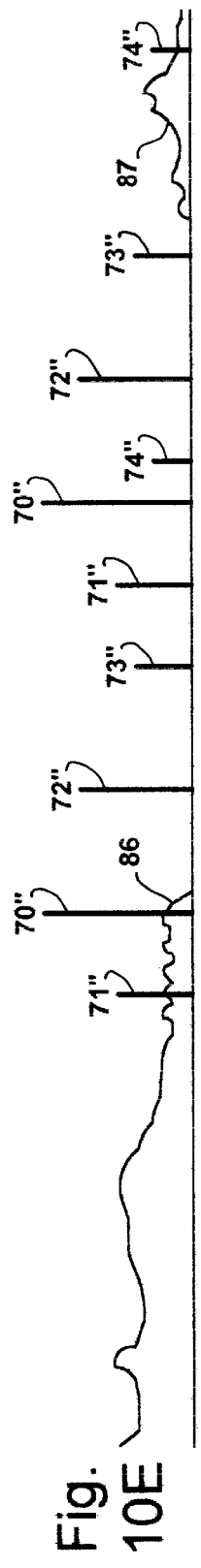
Figure 10F:
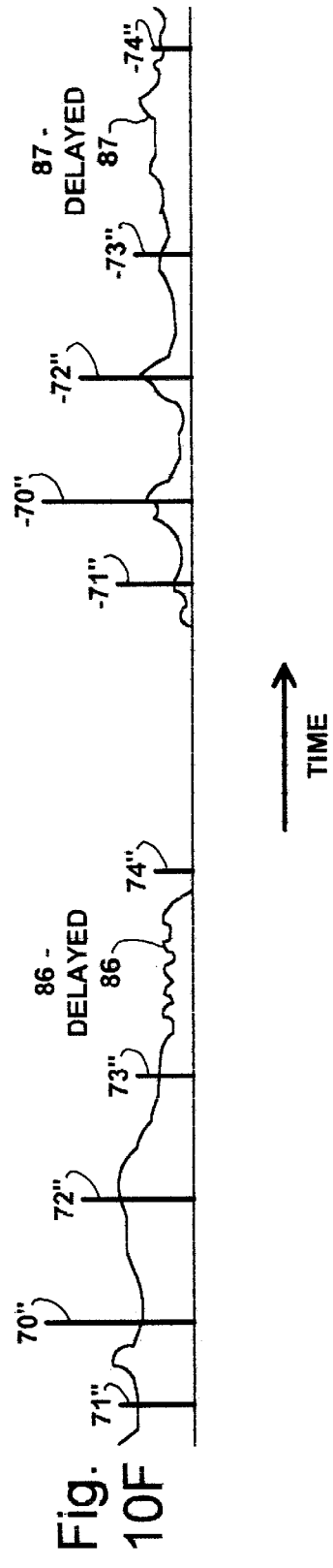

FIGS. 10A, 10B, 10C, 10D, 10E and 10D show time-domain responses at various connections in the FIG. 9 apparatus in the time interval when repetitive-PN1023 sequence training signal occurs. FIGS. 10A, 10B and 10C show the auto-correlation match filter 76 response, that response as delayed 1023 symbols by the digital delay line 78, and the difference between these responses that the digital subtractor 77 supplies as its output signal. FIGS. 10D, 10E and 10F show the auto-correlation match filter 80 response, that response as delayed 1023 symbols by the digital delay line 82, and the difference between these responses that the digital subtractor 81 supplies as its output signal.

The components 71' in the FIG. 10A time-domain response of the PN1023 match filter 76 are cyclically generated in response to the current phasing of the pre-echo of the repetitive-PN1023 sequence corresponding to that of the initial 1023 symbols of the repetitive-PN1023 sequence. The components 72' in the FIG. 10A time-domain response are cyclically generated in response to the current phasing of the least-delayed post-echo of the repetitive-PN1023 sequence corresponding to that of the initial 1023 symbols of the repetitive-PN1023 sequence. The components 73' in the FIG. 10A time-domain response are cyclically generated in response to the current phasing of the post-echo of the repetitive-PN1023 sequence delayed more than 47.5 microseconds, but less than 95 microseconds, being in correspondence with the phasing of the initial 1023 symbols of the repetitive-PN1023 sequence. The components 74' in the FIG. 10A time-domain response are cyclically generated in response to the current phasing of the post-echo of the repetitive PN1023 sequence delayed more than 95 microseconds being in correspondence with the phasing of the final 1023 symbols of the repetitive-PN1023 sequence.

FIG. 10A shows a clutter component 84. A portion of this clutter component 84 arises from the PN1023 match filter 76 response to data preceeding the repetitive-PN1023 sequence and to its echoes, which portion of the clutter component 84 cannot be predicted in the receiver. Another portion of this clutter component 84 arises from the non-cyclic PN1023 match filter 76 response exhibiting edge effects at the beginning of the repetitive-PN1023 sequence, which other portion of the clutter component 84 can be predicted in the receiver.

FIG. 10A shows another clutter component 85 arising from the non-cyclic PN1023 match filter 76 response to the DFS signal succeeding the repetitive-PN1023 sequence and to its echoes. The initial few hundred symbol epochs of clutter component 85 can in most part be predicted in the receiver. The edge effects at the conclusion of the repetitive-PN1023 sequence that the PN1023 match filter 76 response exhibits are readily predictable. The PN1023 match filter 76 response to the first 700 symbol epochs of DFS signal succeeding the repetitive-PN1023 sequence is also readily predictable. These readily predictable components of PN1023 match filter 76 response can be compensated for by a priori knowledge extracted from read-only memory in the computer 40. The PN1023 match filter 76 response to the echoes of the first 700 symbol epochs of DFS signal succeeding the repetitive-PN1023 sequence is not as easily predictable.

The ordinate scale for the clutter components 84 and 85 is expanded in FIGS. 10A, 10B and 10C respective to the principal responses 70' for sake of illustration. The echo components 71', 72', 73' and 74' are also somewhat larger in amplitude respective to the principal responses 70' than is the case for a good-quality transmission channel to the receiver. The PN1023 match filter 76 has an auto-correlation function with 60 dB gain against phases of PN1023 sequence other than the final phase and with 30 dB gain against non-PN1023 signal components, FIG. 10B shows the digital subtractor 77 minuend signal that the digital delay line 78 supplies in response to the digital subtractor 77 subtrahend input signal as delayed by one cycle of the repetitive-PN1023 sequence—i.e., by 1023 symbol epochs.

FIG. 10C shows the difference output signal supplied from the digital subtractor 77. Note that in the difference output signal supplied from the digital subtractor 77 the cepstrum of the final cycle of PN1023 sequence from the minuend signal is separated from the cepstrum of any preceding PN1023 sequence and is not overlapped by components of clutter component 84. The register 79 temporarily stores this separate-cepstrum of the final cycle of PN1023 sequence from the minuend signal and is connected so its contents are available to the filter-coefficient computer 40. As noted previously, the filter-coefficient computer 40 can compensate for the readily predictable components of clutter component 85 using a priori knowledge extracted from read-only memory. Presuming such processing is performed, the responses to pre-echoes in the extended-range cepstrum temporarily stored in the register 79 are contaminated very little by other time-domain response components. Even the responses to post-echoes up to 64 microseconds or so in the extended-range cepstrum are not contaminated very much by other time-domain response components.

The filter-coefficient computer 40 can then separate the time-domain response to pre-echoes to be used in further processing the cyclically repeating cepstrum as modified per FIG. 8B. The separated time-domain response to pre-echoes can be correlated with a corresponding portion of the cyclically repeating cepstrum. The correlation procedures are used to eliminate repeats of responses to pre-echoes and to eliminate aliases of post-echoes that appear as pre-echoes occurring at times when the separated time-domains response to pre-echoes does not exhibit substantial energy.

FIG. 8C shows the result of this further pruning of the cyclically repeating cepstrum. Valid per-echoes remain the only components resending the remnant response to the principal received component 70 in the modified cepstrum of FIG. 8C. The FIG. 8C modifications of the cepstrum are by way of eliminating or reducing temporal components that arose from a cyclic cepstrum based on a PN1023 sequence free from contaminants arising from edge effects, data preceding the repetitive-PN1023 sequence, or DFS signal succeeding the repetitive-PN1023 sequence. Since the FIG. 8C modifications are the results of a pruning procedure, such contaminants in the extended-range cepstrum stored in the register 79 are not carried forward in appreciable degree into the FIG. 8C modifications of the cyclically repeating cepstrum.

The filter-coefficient computer 40 could then use the time-domain response to post-echoes up to 64 microseconds or so as a basis for further pruning the cyclically repeating cepstrum pruned per FIG. 8C. That is, the separated time-domain response to these post-echoes could be correlated with the corresponding portion of the cyclically repeating cepstrum. The correlation procedures would then be used to eliminate repeats of responses to post-echoes and to eliminate aliases of post-echoes delayed more than 95 microseconds that appear as less-delayed post-echoes. FIG. 8D shows the result of these still further pruning of the cyclically repeating cepstrum.

The pruning of the cyclically repeating cepstrum to eliminate repeats of responses to post-echoes and to eliminate aliases of post-echoes delayed more than 95 microseconds can proceed based on an alternative method for extracting the extended-range cepstrum. This alternative method cart reduce the contamination of the responses to longer delayed post-echoes in an extended-range cepstrum, as caused by other time-domain response components.

FIG. 10D shows the time-domain response of auto-correlation digital filter 80 as applied to a digital delay line 82 as input signal thereto and as applied to a digital subtractor 81 as its minuend input signal. The components 70" in the FIG. 10D time-domain response are cyclically generated in response to the current phasing of the repetitive PN1023 sequence corresponding to that of the initial 1023 symbols of the repetitive-PN1023 sequence. The components 71" in the FIG. 10D time-domain response are cyclically generated in response to the current phasing of the pre-echo of the repetitive PN1023 sequence corresponding to that of the initial 1023 symbols of the repetitive-PN1023 sequence. The components 72" in the FIG. 10D time-domain response are cyclically generated in response to the current phasing of the least-delayed post-echo of the repetitive PN1023 sequence corresponding to that of the initial 1023 symbols of the repetitive PN1023 sequence. The components 73" in the FIG. 10D time-domain response are cyclically generated in response to the current phasing of the post-echo of the repetitive-PN1023 sequence delayed more than 47.5 microseconds, but less than 95 microseconds, being in correspondence with the phasing of the initial 1023 symbols of the repetitive-PN1023 sequence. The components 74" in the FIG. 10D time-domain response are cyclically generated in response the current phasing of the post-echo of the repetitive PN1023 sequence delayed more than than 95 microseconds being in correspondence with the phasing of the initial 1023 symbols of the repetitive-PN1023 sequence.

FIG. 10D shows a clutter component 86. A portion of this clutter component 86 arises from the PN1023 match filter 80 response to data preceding the repetitive-PN1023 sequence and to its echoes, which portion of the clutter component 86 cannot be predicted in the receiver. Another portion of this clutter component 86 arises from the non-cyclic PN1023 match filter 80 response exhibiting edge effects at the beginning of the repetitive-PN1023 sequence, which other portion of the clutter component 86 can be predicted in the receiver. This other portion of the clutter component 86 due to edge-effects does not affect the post-echoes of the initial 1023 symbols of the repetitive-PN1023 sequence, which will be of principal concern when analysis of the digital subtractor 81 difference output signal proceeds to conclusion.

FIG. 10D shows a clutter component 87 arising from the PN1023 match filter 80 response to the DFS signal succeeding the repetitive-PN1023 sequence and to its echoes. The clutter component 87 can be predicted in large part in the receiver. The edge effects at the conclusion of the repetitive-PN1023 sequence that the PN1023 match filter 80 response exhibits are readily predictable. The PN1023 match filter 80 response to the first 700 symbol epochs of DFS signal succeeding the repetitive-PN1023 sequence is also readily predictable. The PN1023 match filter 80 response to the echoes of the first 700 symbol epochs of DFS signal succeeding the repetitive-PN1023 sequence is not as easily predictable. However, the prediction of clutter component 87 by the receiver is not a matter of much concern in the alternative method for extracting the extended-range cepstrum. This is because the extended-range cepstrum extracted in this alternative method is contaminated principally by the clutter component 86 and very little if at all, by the clutter component 87.

The ordinate scale for the clutter components 86 and 87 is expanded in FIGS. 10D, 10E and 10F respective to the principal responses 70" forsake of illustration. The echo components 71", 72", 73" and 74" are also somewhat larger in amplitude respective to the principal responses 70' than is the case for a good-quality transmission channel to the receiver. The PN1023 match filter 80 has an auto-correlation function with 60 dB gain against phases of PN1023 sequence other than the initial phase and with 30 dB gain against non-PN1023 signal components.

FIG. 10E shows the digital subtractor 81 subtrahend signal that the digital delay line 82 supplies in response to the digital subtractor 81 minuend input signal as delayed by one cycle of the repetitive-PN1023 sequence—i.e., by 1023 symbol epochs.

FIG. 10F shows the difference output signal supplied from the digital subtractor 81. Note that the cepstrum of the initial cycle of PN1023 sequence is separated from the cepstrum of any following PN1023 sequence in the difference output signal supplied from the digital subtractor 81 and usually is not overlapped by components of clutter component 88. The register 83 temporarily stores this separated cepstrum of the initial cycle of PN1023 sequence from the minuend signal and is connected so its contents are available to the filter-coefficient computer 40. The filter-coefficient computer 40 can compensate for the readily predictable components of clutter component 87 using a priori knowledge extracted from read-only memory. However, only post-echoes delayed more than 150 microseconds or so are likely ever to suffer consequential amounts of contamination by the clutter component 87. Presuming such processing is performed, the responses to pre echoes in the extended-range cepstrum temporarily stored in the register 83 are contaminated by leading-edge effects of the PN1023 match filtering, but the portion of this cepstrum containing just responses to post-echoes is not.

The portion of the extended cepstrum stored in the register 83 concerning post-echoes delayed more than 65 microseconds is contaminated with PN1023 match filter 76 response to unknown data as well as to responses to echoes. The portion of the extended cepstrum stored in the register 83 concerning post-echoes delayed more than 65 microseconds is contaminated only with auto-correlation digital filter 80 response to post-echoes of data preceding the repetitive-PN1023 sequence. So in the great majority of instances, the contamination of echoes delayed more than 65 microseconds is less in the extended cepstrum stored in the register 83 than in the extended cepstrum stored in the register 79. Accordingly, correlating the separated time-domain response to the post-echoes delayed more than 65 microseconds in the extended cepstrum stored in the register 83 with the corresponding portion of the cyclically repeating cepstrum pruned per FIG. 8C is the more reliable basis for the further pruning that cyclically repeating cepstrum. These correlation procedures provide a more reliable basis an which to eliminate repeats of responses to post-echoes and to eliminate aliases of post-echoes delayed more than 95 microseconds that appear as less-delayed post-echoes.

FIG. 8D depicts the result of eliminations by this alternative method, as well as by the method based on the extended cepstrum stored in the register 79. With either one of these methods, the FIG. 8D modifications of the cepstrum are by way of eliminating or reducing temporal components that arose from a cyclic cepstrum based on a PN1023 sequence free from contaminants arising from edge effects data preceding the repetitive-PN1023 sequence, or DFS signal succeeding the repetitive-PN1023 sequence. Accordingly, such contaminants in the separated time-domain response to post-echoes delayed more than 65 microseconds are not carried forward in appreciable degree into the FIG. 8D modification of the cyclically repeating cepstrum. The alternative method based on the extended cepstrum stored in the register 83 facilitates the pruning away of repeats of responses to post-echoes and aliases of post-echoes delayed more than 95 microseconds that have smaller energy, since the post-echoes giving rise to these components can be better distinguished from clutter.

The cycles of the cyclically repeating cepstrum become half-cycles of a cepstrum that cyclically repeats in FIG. 8D without wrap-around, or at least with reduced wrap-around. One cycle of this unwrapped cepstrum provides the improved basis upon which the filter-coefficient computer 40 can calculate filter coefficients for the adaptive channel-equalization and echo-cancellation filtering component FIR filters 33 and 35.

Receiver designs that dispense with the auto-correlation digital filter 80, the digital subtractor 81, the digital delay line 82 and the extended-range cepstrum register 83 are believed to be practical. The separation of pre-echoes from post-echoes is more important to do than pruning away weaker-energy spurious post-echoes, since weak-energy post-echoes are readily suppressed by data-driven methods of adaptive filtering—e.g., decision-feedback gradient methods. Post-echoes are cancelled by the IIR filter portion of the adaptive channel-equalization and echo-cancellation filtering without appreciably increasing the noise in the filter response. Pre-echo energy is reduced by the FIR filter 33 portion of the adaptive filtering, which in its response replaces the pre-echoes in its input signal with lower-amplitude pre-echoes more advanced in time. This procedure also increases the noise in the adaptive filtering response. Mis-identification of a long-delayed post-echo as a pre-echo undesirably conditions the FIR filter 33 portion of the adaptive filtering to insert spurious pre-echoes in the adaptive filtering response, which insertion procedure also increases the noise in that response.

Receiver designs that average match filter responses from several data fields, better to define static echo conditions, are also contemplated.

Especially with the design of receivers capable of handling greater echo ranges extending from the most advanced-in-time pre-echoes to the most delayed-in-time post-echoes, there is a concern that an increased number of multipliers may be needed in the adaptive filtering. Besides the cost in hardware, this tends to exacerbate reduction of C/N by stochastic jitter. Sparse equalization methods have been employed to reduce multiplier requirements and to lessen the reduction of C/N by stochastic jitter. In these methods adaptive bulk delay determines the differential delays between certain kernel taps of the adaptive filters that have non-zero weighting coefficients and accordingly connect to digital multipliers to supply their multiplicand signals. In such receivers the cepstrum provided to the computer 40 from the computer 49 in the FIG. 5 DTV receiver and from the PN1023 auto-correlation filter 52 in the FIG. 6 DTV receiver furnishes a basis for allocating the adaptive bulk delays. The computer 40 can be programmed to analyze the cepstrum to select an optimal boundary for the time interval over which the FIR filter 33 time-domain kernel extends for suppressing post echoes.

Figure 11:
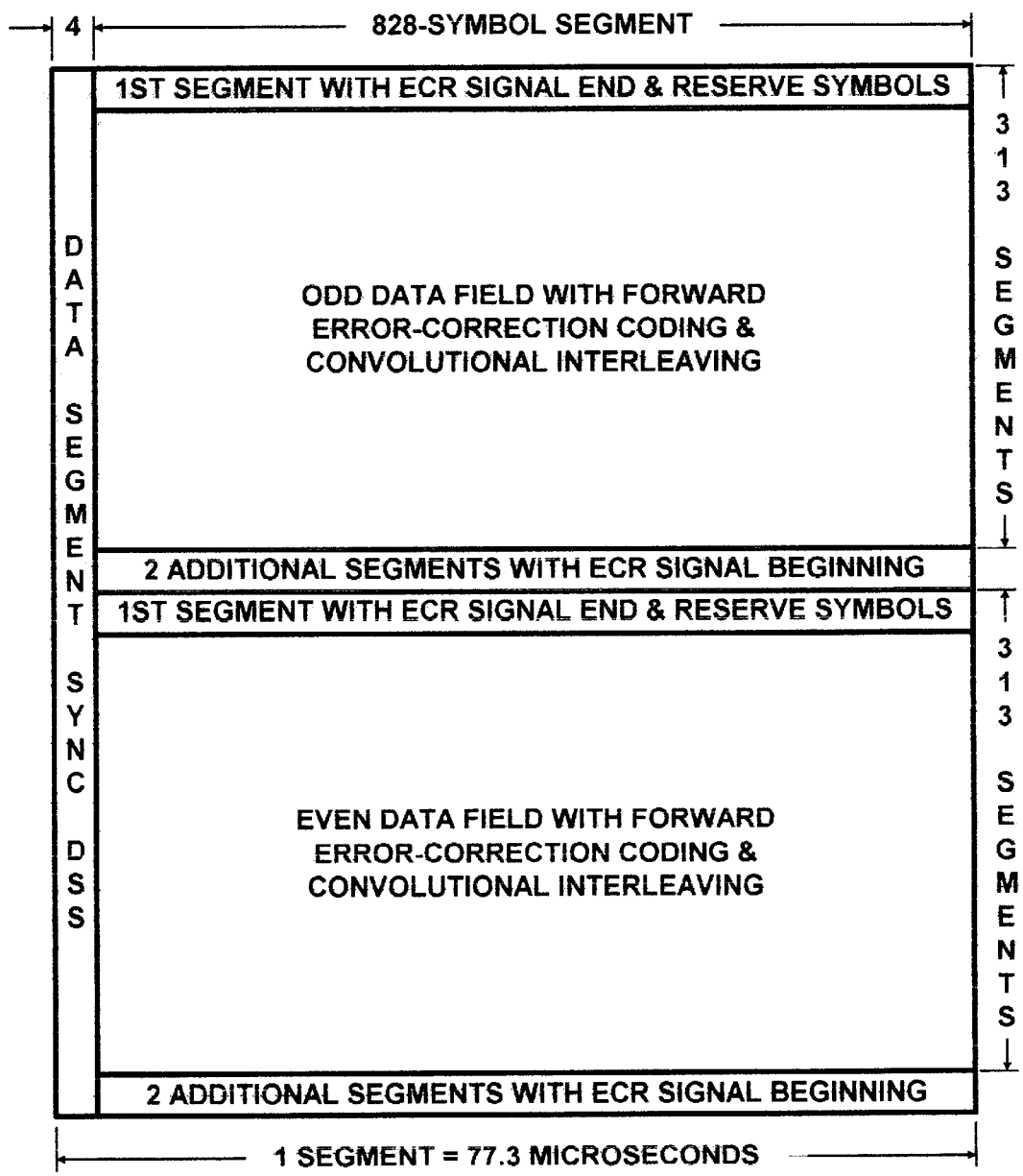
FIG. 11 is a diagram of an ATSC digital television signal data frame modified in accordance with an aspect of the invention to include 315 data segments in each of its data fields, to omit A/53 data field synchronization signal in the first data segment of each data field, and to include in each data field a training signal for the adaptive filtering that provides channel-equalization and echo-cancellation, which training signal is a repetitive-PN1023 sequence also employed as a data field synchronization signal.

FIG. 11 is a diagram of an ATSC digital television signal data frame modified to include two extra data segments at the end of each of its two data fields, which contain the beginning of a repetitive-PN1023 sequence that is used as a training signal for the adaptive filtering that provides channel equalization and echo-cancellation. The initial, first data segment in each data field differs from that specified by A/53, being modified in that the PN511 sequence is omitted, as well as at least a portion of the triple-PN63 sequence. The repetitive-PN1023 sequence concludes in the portion of that initial data segment thus vacated. The repetitive-PN1023 sequence can be a truncated version of that shown in FIGS. 1A and 1B, being shortened on its concluding end. The ONEs in the truncated repetitive-PN1023 sequence will still correspond to +5 carrier modulation values in the digital television signal, and the ZEROs in the truncated repetitive-PN1023 sequence will still correspond to −5 carrier modulation values.

Figure 12D:
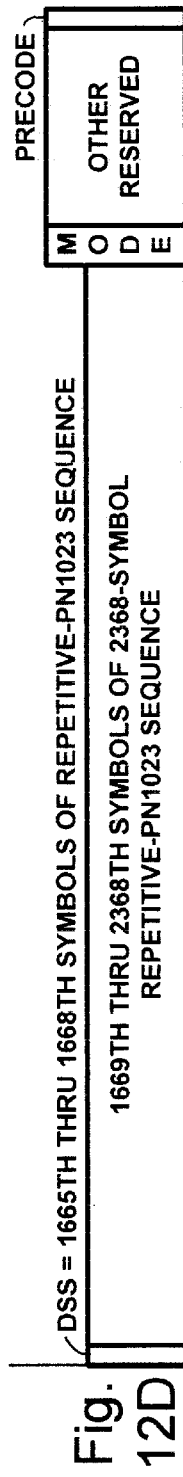
Figure 12E:
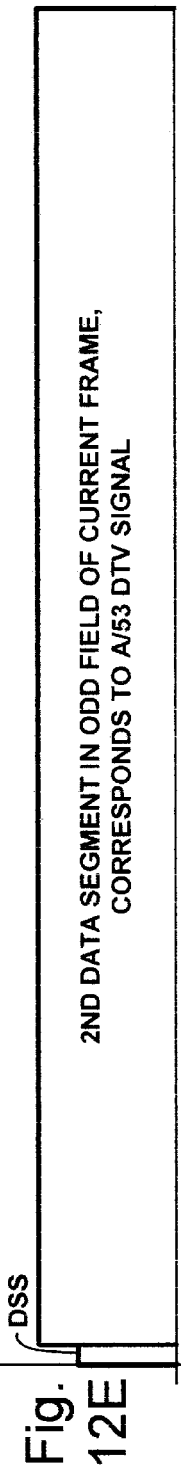
Figure 12F:
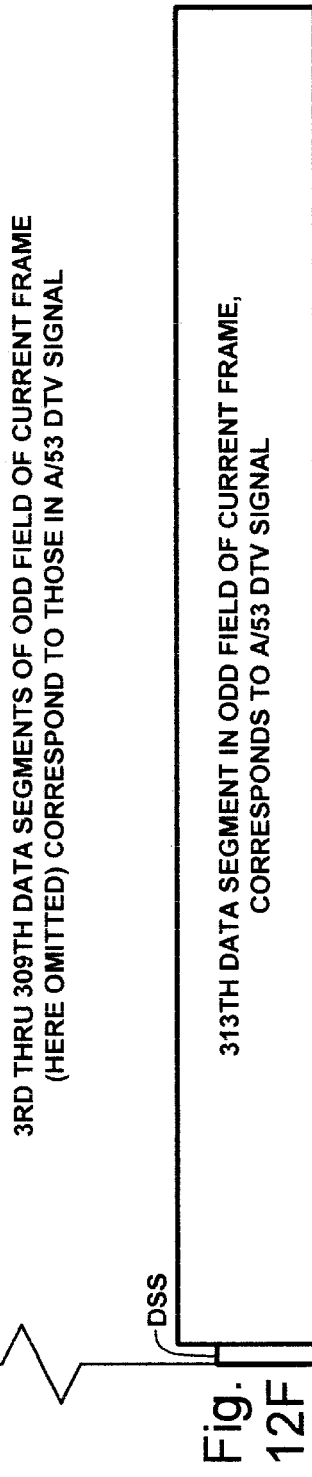
Figure 12G:
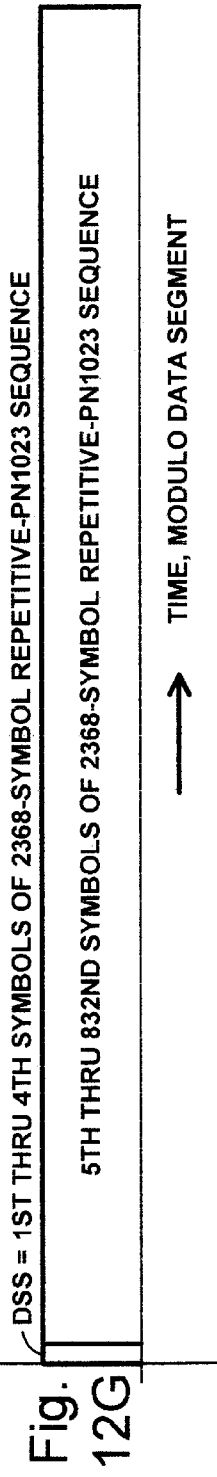

FIGS. 12A, 12B and 12C depict the symbol content of the 313$^{th}$, 314$^{th}$ hand 315$^{th}$ data segments of the even data field of a previous data frame in a FIG. 11 DTV signal broadcast in accordance with the invention. FIGS. 12D and 12E graph the symbol content of the initial and second data segments of tie succeeding odd data field in the current data frame. FIGS. 12F, 12G and 12H depict the symbol content of the 313$^{th}$, 314$^{th}$ and 315$^{th}$ data segments of that succeeding odd data field. FIGS. 12I and 12J graph the symbol content of the initial and second data segments of the even data field of the next data frame.

The second through 313$^{th}$ data segments of the data fields can be the same as those specified in A/53. The third through 312$^{th}$ data segment odd field of the current frame, which would occur in the time interval between the conclusion of the second data segment shown in FIG. 12E and the beginning of the 313$^{th}$ data segment shown in FIG. 12F are omitted from the drawing for reasons of economy of drawing.

The 314$^{th}$ and 315$^{th}$ data segments concluding each data field contain the first 1664 symbols of the 2368 repetitive-PN1023-sequence ECR signal, which continues into the initial data segments of the succeeding data fields. FIGS. 12B and 12C show the first 1664 symbols of the repetitive-PN1023-sequence ECR signal inserted into the 314$^{th}$ and 315$^{th}$ data segments of the even data field of the data frame previous to the current data frame depicted in FIGS. 12D, 12E, 12F, 12G and 12H. FIGS. 12G and 12H show the first 1664 symbols of the repetitive-PN1023-sequence ECR signal inserted in to the 314$^{th}$ and 315$^{th}$ data segments of the odd data field of the current data frame. The data segment synchronizing (DSS) signals of the 314$^{th}$ and 315$^{th}$ data segments of each data field are incorporated within the repetitive-PN1023-sequence ECR signal transmitted during those data segments. So is the DSS signal at the beginning of the initial data segment of the succeeding field, as depicted in FIGS. 12D and 12I.

The repetitive-PN1023 sequence of FIGS. 12B, 12C and 12D varies between −5 and +5 modulation levels in the 8-VSB signal, as A/53 specifies such modulation levels. The repetitive-PN1023 sequence of FIGS. 12G, 12H and 12I also varies between −5 and +5 modulation levels. These modulation levels for the repetitive-PN1023 sequences facilitate the 4-symbol DSS sequences being incorporated within these repetitive-PN1023 sequences.

The initial data segment of an odd data field, as shown in FIG. 12D, and the initial data segment of a succeeding even data field, as shown in FIG. 12, each begin with a 4-symbol data segment sync (DSS) sequence incorporated within a portion of one of the 2368-symbol repetitive-PN1023 sequences followed by the concluding 700 symbols of that sequence. The conclusion of the repetitive-PN1023 sequence is followed by a 24-symbol mode code, and a 104-symbol reserved portion that concludes the data segment.

Because there are only 315 data segments per data field for the signal of FIGS. 12A, 12B, 12C, 12D, 12E, 12F, 12G, 12H, 12I and 12J, rather than 316 data segments per data field, a transmitter for the is signal will differ somewhat from the FIG. 4 transmitter. Besides a change in the general clocking, the transmitter for this 315-data-segments-per-field signal, will not include the ROM 13 for storing PN511 and triple-PN63 sequences. The timing of the DFS assembler 12, the multiplexer 11 for inserting the DFS signal, and the multiplexer 17 for inserting training signal will be affected in ways obvious to one of ordinary skill in the art of digital communications system design The addressing of the ROM 18 for generating repetitive-PN1023 training signal will also be affected in a way obvious to one of ordinary skill in the art of digital communications system design.

A receiver for the signal of FIGS. 12A, 12B, 12C, 12D, 12E, 12F, 12G, 12H, 12I and 12J with 315 data segments per data field will differ somewhat from the receiver for the signal of FIGS. 3A, 3B, 3C, 3D, 3E, 3F, 3G, 3H, 3I, 3J, 3K and 3L with 316 data segments per data field. The FIG. 5 receiver portion is modified in regard to timing the gate 43 to select one cycle of repetitive-PN1023 sequence from each training signal to be used by the computer 44 for computing the DFT power spectrum. The FIG. 6 receiver portion is modified in regard to timing the multiplexer 50 to select one cycle of repetitive-PN1023 sequence from each training signal for application to the shift register 51 to he recycled throughout the following data field. Minor modifications in the application of the cepstrum to the filter-coefficient computer 52 will need to be made in both the FIG. 5 and FIG. 6 receiver portions.

The FIG. 7 receiver portion will be modified with respect to the synchronizing signal extraction circuitry 57 and with respect to, the receiver clocking and timing circuitry 58. The portions of the synchronizing signal extraction circuitry 57 having to do with the extraction of the DSS signals will remain pretty much the same, but the portions having to do with the extraction of the DFS signals must be changed because the PN511 sequence and the triple-PN63 sequence of the A/53 standard are no longer available. The data-field-synchronizing signal can be generated in response to the occurrence in the baseband DTV signal of a cycle of PN1023 sequence of specific phase a prescribed time later than the occurrence of a DSS sequence, for example. The receiver clocking and timing circuitry 58 will be modified to include a counter that counts data segments with the data segment count being reset every 315 data segments by the data-field-synchronizing signal generated by the modified synchronizing signal extraction circuitry 57.

A variant of the 316-data-segment-per-field signal of FIGS. 3A, 3B, 3C, 3D, 3E, 3F, 3G, 3H, 3I, 3J, 3K and 3L begins the repetitive-PN1023-sequence training signal 28 symbol epochs later in the 314$^{th}$ data segment of each data field, to permit transmission of 24 symbols that will terminate the trellis coding lattice with a set of standard states in the trellis decoder before trellis coding is discontinued as the training signal begins. Trellis coding then starts afresh from this set of standard states in the second data segment of each data field, and no twelve-symbol precode is included at the end of the first data segment. If this variant is transmitted, the FIG. 4 transmitter is modified to omit the temporary storage 10 for the last twelve symbols of the 313$^{th}$ data segment of the preceding data field, and the DFS signal assembler 12 is modified. Provision will also be made to terminate the trellis coding lattice just before the 101$^{st}$ symbol of the 314$^{th}$ data segment of each data field. A read only memory addressed by the lattice states stored at the conclusion of the 313$^{th}$ data segment in a trellis decoder located at the transmitter can be used for terminating the trellis coding lattice, for example. The changes in clocking the trellis decoder are obvious to one of ordinary skill in the art of digital communications system design.

A variant of the 315-data-segment-per-field signal of FIGS. 12A, 12B, 12C, 12D, 12E, 12F, 12G, 12H, 12I and 12J that begins the repetitive-PN1023-sequence training signal 28 symbol epochs later in the 314$^{th}$ data segment of each data field, to permit transmission of symbols that will terminate the trellis coding lattice with a set of standard states in the trellis decoder before trellis coding is discontinued as the training signal begins, is also possible.

In still other training signals embodying aspects of the invention, the beginning of the repetitive-PN1023 sequence may be deferred for several symbol epochs to accommodate the inclusion of a prescribed annunciator sequence to announce the subsequent arrival of the repetitive-PN1023 sequence.

The training signals described in the foregoing application facilitate adaptive equalization in DTV receivers to compensate for imperfections in DTV signals received via cable transmission and via satellite transmission, as well as DTV signals received via terrestrial over-the-air broadcasting.

What is claimed is:

1. A method of structuring each of a succession of consecutive data fields for digital television broadcasting to at least one receiver having adaptive equalization and echo suppression filtering therein, said method comprising steps of:
   dividing each said data field into a prescribed number of successive data segments of equal durations, each containing a prescribed number of plural-modulation-level symbols; and
   beginning each data segment with a respective data segment synchronizing sequence of common type, which data segment synchronizing sequence consists of symbols of first and second modulation levels as used in said plural-modulation-level symbols; said method being improved to further comprise a step of:
      including within consecutive data segments in a first portion of each said data field a prescribed number more than one of consecutive cycles of a repetitive pseudo-random noise sequence that extends into each of said consecutive data segments and is composed entirely of symbols each of one of said first and said second modulation levels, a full cycle of said repetitive pseudo-random noise sequence having a duration longer than the duration of each said data segment, and said repetitive pseudo-random noise sequence incorporating at least one said data segment synchronizing sequence of said common type.

2. The method of claim 1, wherein said prescribed number more than one of consecutive cycles of said repetitive pseudo-random noise sequence included within consecutive data segments in the first portion of each said data field is at least two.

3. The method of claim 1, wherein said repetitive pseudo-random noise sequence is a repetitive PN1023 sequence.

4. A transmitter for digital television signals broadcast in accordance with the method of claim 3.

5. A receiver for digital television signals broadcast in accordance with the method of claim 1, said receiver comprising:
   front-end circuitry for supplying an amplified intermediate-frequency signal responsive to a radio-frequency broadcast digital television signal selected for reception;
   demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;
   gating circuitry for selectively reproducing a respective set of successive digital samples descriptive of a selected cycle of each occurrence of said repetitive pseudo-random noise sequence in the digitized baseband broadcast digital television signal recovered by said demodulator and analog-to-digital conversion circuitry, said selected cycle being sufficiently delayed from the beginning of said repetitive pseudo-random noise sequence to be less affected by post-echoes of signal preceding said repetitive pseudo-random noise sequence, and said selected cycle being sufficiently before the conclusion of said repetitive pseudo-random noise sequence to be less affected by pre-echoes of signal succeeding said repetitive pseudo-random noise sequence;
   DFT computer apparatus for computing the discrete Fourier transform of the power spectrum of said respective set of successive digital samples said gating circuitry selectively reproduces;
   circuitry for generating a discrete Fourier transform characterizing the actual transmission channel by determining the quotient of
      each term that said DFT computer apparatus computes of said discrete Fourier transform of the power spectrum of said respective set of successive digital samples that said gating circuitry selectively reproduces, and
      the corresponding term of a discrete Fourier transform indicative of the response of an ideal transmission channel to said selected cycle of said repetitive pseudo-random noise sequence;
   inverse-discrete-Fourier-transform circuitry for computing the inverse-Fourier transform of said discrete Fourier transform characterizing said actual transmission channel; and
   adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said inverse-Fourier transform.

6. The method of claim 1, wherein said repetitive pseudo-random noise sequence is a repetitive PN1023 sequence, further comprising steps of:
   forward-error-correction coding data to generate forward-error-correction coded data;
   convolutionally interleaving said forward-error-correction coded data to generate convolutionally interleaved forward-error-correction coded data; and
   processing said convolutionally interleaved forward-error-correction coded data for inclusion in consecutive data segments within a prescribed second portion of each said data field.

7. A transmitter for digital television signals broadcast in accordance with the method of claim 6.

8. A receiver for digital television signals broadcast in accordance with the method of claim 6, said receiver comprising:
   front-end circuitry or supplying an amplified intermediate-frequency signal responsive to a radio-frequency broadcast digital television signal selected for reception;
   demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

gating circuitry for selectively reproducing a respective set of successive digital samples of 1023 symbol epochs duration from a selected cycle of each occurrence of said repetitive PN1023 sequence in the digitized baseband broadcast digital television signal recovered by said demodulator and analog-to-digital conversion circuitry, said selected cycle being sufficiently delayed from the beginning of said repetitive PN1023 sequence to be less affected by post-echoes of signal preceding said repetitive PN1023 sequence, and said selected cycle being sufficiently before the conclusion of said repetitive PN1023 sequence to be less affected by pre-echoes of signal succeeding said repetitive PN1023 sequence;

DFT computer apparatus for computing the discrete Fourier transform of the power spectrum of said respective set of successive digital samples of 1023 symbol epochs duration selectively reproduced by said gating circuitry;

circuitry for generating a discrete Fourier transform characterizing the actual transmission channel by determining the quotient of
  each term of said discrete Fourier transform of the power spectrum of said respective set of successive digital samples of 1023 symbol epochs duration that said DFT computer apparatus computes, and
  the corresponding term of a discrete Fourier transform indicative of the response of an ideal transmission channel to the selected cycle of said repetitive PN1023 sequence inverse-discrete-Fourier-transform circuitry for computing the inverse-Fourier transform of said discrete Fourier transform characterizing said actual transmission channel;

adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said inverse-Fourier transform;

a symbol decoder for decoding the response of said adaptive channel-equalization and echo-cancellation filtering to recover interleaved data;

a convolutional de-interleaver connected for de-interleaving the interleaved data recovered by said symbol decoder to generate packets of de-interleaved data;

error-detection-and-correction circuitry connected for detecting any errors in each of said packets of de-interleaved data, said error-detection-and-correction circuitry connected for supplying said packets of de-interleaved data with each one of said packets that had fewer than a prescribed number of errors having been corrected;

a data de-randomizer connected for receiving from said error-detection-and-correction circuitry said packets of de-interleaved data with each one of said packets that had fewer than a prescribed number of errors having been corrected, and for generating a data de-randomizer output signal by exclusive-ORing said de-interleaved data with a prescribed de-randomizing signal; and a packet sorter connected for supplying in each of a plurality of output signals therefrom a particular set of identifiable data packets sorted from said data de-randomizer output signal in response to a packet identification signal for each data packet therein not left in error by said error-detection-and-correction circuitry.

9. A receiver for digital television signals broadcast in accordance with the method of claim 6, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

auto-correlation filtering apparatus of cyclical type, connected for performing a circular convolution of a single cycle of a reference PN1023 sequence with a selected single cycle of repetitive PN1023 sequence from each occurrence of said repetitive PN1023 sequence in said digitized baseband broadcast digital television signal from said demodulator and analog-to-digital conversion circuitry, thereby to generate a cepstrum characterizing the transmission channel to said receiver for digital television signals, said selected cycle being sufficiently delayed from the beginning of said repetitive PN1023 sequence to be less affected by post-echoes of signal preceding said repetitive PN1023 sequence, and said selected cycle being sufficiently before the conclusion of said repetitive PN1023 sequence to be less affected by pre-echoes of signal succeeding said repetitive PN1023 sequence; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said cepstrum;

a symbol decoder for decoding the response of said adaptive channel-equalization and echo-cancellation filtering to recover interleaved data;

a convolutional de-interleaver connected for de-interleaving the interleaved data recovered by said symbol decoder to generate packets of de-interleaved data;

error-detection-and-correction circuitry connected for detecting any errors in each of said packets of de-interleaved data, said error-detection-and-correction circuitry connected for supplying said packets of de-interleaved data with each one of said packets that had fewer than a prescribed number of errors having been corrected;

a data de-randomizer connected for receiving from said error-detection-and-correction circuitry said packets of de-interleaved data with each one of said packets that had fewer than a prescribed number of errors having been corrected, and for generating a data de-randomizer output signal by exclusive-ORing said de-interleaved data with a prescribed de-randomizing signal; and a packet sorter connected for supplying in each of a plurality of output signals therefrom a particular set of identifiable data packets sorted from said data de-randomizer output signal in response to a packet identification signal for each data packet therein not left in error by said error-detection-and-correction circuitry.

10. A receiver for digital television signals broadcast in accordance with the method of claim 6, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

a direct-component-suppression filter connected to receive as its input signal said digitized baseband broadcast digital television signal from said demodulator and analog-to-digital conversion circuitry, said direct-component-suppression filter connected to supply a response to said digitized baseband broadcast digital television signal that suppresses any direct component thereof;

auto-correlation filtering apparatus of non-cyclical type, connected for performing a linear convolution of a single cycle of a reference PN1023 sequence with each occurrence of said repetitive PN1023 sequence in said response of said direct-component-suppression filter, thereby to generate a correlation result, said single cycle of said reference PN1023 sequence corresponding to a cycle of said repetitive PN1023 sequence sufficiently delayed from the beginning thereof to be less affected by post-echoes of signal preceding said repetitive PN1023 sequence;

a comb filter connected to receive as its input signal said correlation result and to supply a comb filter response which differentially combines said correlation result with itself as delayed 1023 symbol epochs, said comb filter response including an extended cepstrum characterizing the transmission channel to said receiver for digital television signals, which extended cepstrum is generated responsive to the consecutive cycles of said repetitive PN1023 sequence in each data field;

an extended-cepstrum register connected for selecting from said comb filter response the extended cepstrum generated responsive to the consecutive cycles of said repetitive PN1023 sequence in each data field, to be temporarily stored in said extended-cepstrum register;

adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said extended cepstrum;

a symbol decoder for decoding the response of said adaptive channel-equalization and echo-cancellation filtering to recover interleaved data;

a convolutional de-interleaver connected for de-interleaving the interleaved data recovered by said symbol decoder to generate packets of de-interleaved data;

error-detection-and-correction circuitry connected for detecting any errors in each of said packets of de-interleaved data, said error-detection-and-correction circuitry connected for supplying said packets of de-interleaved data with each one of said packets that had fewer than a prescribed number of errors having been corrected;

a data de-randomizer connected for receiving from said error-detection-and-correction circuitry said packets of de-interleaved data with each one of said packets that had fewer than a prescribed number of errors having been corrected, and for generating a data de-randomizer output signal by exclusive-ORing said de-interleaved data with a prescribed de-randomizing signal; and a packet sorter connected for supplying in each of a plurality of output signals therefrom a particular set of identifiable data packets sorted from said data de-randomizer output signal in response to a packet identification signal for each data packet therein not left in error by said error-detection-and-correction circuitry.

11. The method of claim 6, wherein said step of processing said convolutionally interleaved forward-error-correction coded data for inclusion in data segments within a prescribed first portion of each said data field includes sub-steps of:

trellis coding said convolutionally interleaved forward-error-correction coded data to generate trellis-coded data; and apportioning said trellis-coded data among data segments within said prescribed second portion of each said data field.

12. A transmitter for digital television signals broadcast in accordance with the method of claim 11.

13. A receiver for digital television signals broadcast in accordance with the method of claim said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

gating circuitry for selectively reproducing a respective set of successive digital samples of 1023 symbol epochs duration from a selected cycle of each occurrence of said repetitive PN1023 sequence in the digitized baseband broadcast digital television signal recovered by said demodulator and analog-to-digital conversion circuitry, said selected cycle being sufficiently delayed from the beginning of said repetitive PN1023 sequence to be less affected by post-echoes of signal preceding said repetitive PN1023 sequence, and said selected cycle being sufficiently before the conclusion of said repetitive PN1023 sequence to be less affected by pre-echoes of signal succeeding said repetitive PN1023 sequence;

DFT computer apparatus for computing the discrete Fourier transform of the power spectrum of said respective set of successive digital samples of 1023 symbol epochs duration;

circuitry for generating a discrete Fourier transform characterizing the actual transmission channel by determining the quotient of each term of said discrete Fourier transform of the power spectrum of said respective set of successive digital samples of 1023 symbol epochs duration that said DFT computer apparatus computes, and the corresponding term of a discrete Fourier transform indicative of the response of an ideal transmission channel to the selected cycle of said repetitive PN1023 sequence;

inverse-discrete-Fourier-transform circuitry for computing the inverse-Fourier transform of said discrete Fourier transform characterizing said actual transmission channel;

adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said inverse-Fourier transform;

a trellis decoder for decoding the response of said adaptive channel-equalization and echo-cancellation filtering to recover interleaved data;

a convolutional de-interleaver connected for de-interleaving the interleaved data recovered by said symbol decoder to generate packets of de-interleaved data;

error-detection-and-correction circuitry connected for detecting any errors in each of said packets of dc-interleaved data, said error-detection-and-correction circuitry connected for supplying said packets of de-interleaved data with each one of said packets that had fewer than a prescribed number of errors having been corrected;

a data de-randomizer connected for receiving from said error-detection-and-correction circuitry said packets of de-interleaved data with each one of said packets that had fewer than a prescribed number of errors having been corrected, and for generating a data de-randomizer output signal by exclusive-ORing said de-interleaved data with a prescribed de-randomizing signal; and a packet sorter connected for supplying in each of a plurality of output signals therefrom a particular set of identifiable data packets sorted from said data de-randomizer output signal in response to a packet identification signal for each data packet therein not left in error by said error-detection-and-correction circuitry.

14. A receiver for digital television signals broadcast in accordance with the method of claim 11, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

auto-correlation filtering apparatus of cyclical type, connected for performing a circular convolution of a single cycle of a reference PN1023 sequence with a selected single cycle of repetitive PN1023 sequence from each occurrence of said repetitive PN1023 sequence in said digitized baseband broadcast digital television signal from said demodulator and analog-to-digital conversion circuitry, thereby to generate a cepstrum characterizing the transmission channel to said receiver for digital television signals, said selected cycle being sufficiently delayed from the beginning of said repetitive PN1023 sequence to be less affected by post-echoes of signal preceding said repetitive PN1023 sequence, and said selected cycle being sufficiently before the conclusion of said repetitive PN1023 sequence to be less affected by ore-echoes of signal succeeding said repetitive PN1023 sequence;

adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said cepstrum;

a trellis decoder for decoding the response of said adaptive channel-equalization and echo-cancellation filtering to recover interleaved data;

a convolutional de-interleaver connected for de-interleaving the interleaved data recovered by said symbol decoder to generate packets of de-interleaved data;

error-detection-and-correction circuitry connected for detecting any errors in each of said packets of de-interleaved data, said error-detection-and-correction circuitry connected for supplying said packets of dc-interleaved data with each one of said packets that had fewer than a prescribed number of errors having been corrected;

a data de-randomizer connected for receiving from said error-detection-and-correction circuitry said packets of de-interleaved data with each one of said packets that had fewer than a prescribed number of errors having been corrected, and for generating a data de-randomizer output signal by exclusive-ORing said de-interleaved data with a prescribed de-randomizing signal; and a packet sorter connected for supplying in each of a plurality of output signals therefrom a particular set of identifiable data packets sorted from said data de-randomizer output signal in response to a packet identification signal for each data packet therein not left in error by said error-detection-and-correction circuitry.

15. A receiver for digital television signals broadcast in accordance with the method of claim 11, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

a direct-component-suppression filter connected to receive as its input signal said digitized baseband broadcast digital television signal from said demodulator and analog-to-digital conversion circuitry, said direct-component-suppression filter connected to supply a response to said digitized baseband broadcast digital television signal that suppresses a direct component thereof;

auto-correlation filtering apparatus of non-cyclical type, connected for performing linear convolution of a single cycle of a reference PN1023 sequence with the response of said direct-component-suppression filter, to supply a correlation result;

a comb filter connected to receive as its input signal said match filter response correlation result and to supply a comb filter response which differentially combines said match filter response correlation result with itself as delayed 1023 symbol epochs, said comb filter response including an extended cepstrum characterizing the transmission channel to said receiver for digital television signals, which extended cepstrumis generated responsive to the consecutive cycles of said repetitive PN1023 sequence in each data field;

an extended-cepstrum register connected for selecting from said comb filter response the extended cepstrum generated responsive to the consecutive cycles of said repetitive PN1023 sequence in each data field, to be temporarily stored in said extended-cepstrum register;

adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said extended cepstrum;

a trellis decoder for decoding the response of said adaptive channel-equalization and echo-cancellation filtering to recover interleaved data;

a convolutional de-interleaver connected for de-interleaving the interleaved data recovered by said symbol decoder to generate packets of de-interleaved data;

error-detection-and-correction circuitry connected for detecting any errors in each of said packets of de-interleaved data, said error-detection-and-correction circuitry connected for supplying said packets of de-interleaved data with each one of said packets that had fewer than a prescribed number of errors having been corrected;

a data de-randomizer connected for receiving from said error-detection-and-correction circuitry said packets of de-interleaved data with each one of said packets that had fewer than a prescribed number of errors having been corrected, and for generating a data de-randomizer output signal by exclusive-ORing said de-interleaved data with a prescribed de-randomizing signal; and a packet sorter connected for supplying in each of a plurality of output signals therefrom a particular set of identifiable data packets sorted from said data de-randomizer output signal in response to a packet identification signal for each data packet therein not left in error by said error-detection-and-correction circuitry.

16. A receiver for digital television signals broadcast in accordance with the method of claim 3, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

auto-correlation filtering apparatus of non-cyclical type, connected for performing linear convolution of a single cycle of a reference pseudo-random noise sequence with said digitized baseband broadcast digital television signal, to supply a correlation result containing a repeating cepstrum in response to the first portion of each said data field;

circuitry for reproducing one cepstrum from each said repeating cepstrum, thereby to supply a separated cepstrum; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to ones of said separated cepstrums.

17. A receiver as set forth in claim 16, further comprising:

a direct-component-suppression filter connected to receive as its input signal said digitized baseband broadcast digital television signal recovered by said demodulator and analog-to-digital conversion circuitry, which input signal is accompanied by a direct component, said direct-component-suppression filter being connected to supply said auto-correlation filtering apparatus with said digitized baseband broadcast digital television signal from which accompanying direct component is suppressed.

18. A receiver for digital television signals broadcast in accordance with the method of claim said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

auto-correlation filtering apparatus of non-cyclical type, connected for performing linear convolution of a single cycle of a reference PN1023 sequence with said digitized baseband broadcast digital television signal, to supply a correlation result containing a set of repeated cepstrums in response to the first portion of each said data field;

circuitry for reproducing one cepstrum from each said repeating cepstrum, thereby to supply a separated cepstrum;

adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to ones of said separated cepstrums;

a symbol decoder for decoding the response of said adaptive channel-equalization and echo-cancellation filtering to recover interleaved data;

a convolutional de-interleaver connected for de-interleaving the interleaved data recovered by said symbol decoder to generate packets of de-interleaved data;

error-detection-and-correction circuitry connected for detecting any errors in each of said packets of de-interleaved data, said error-detection-and-correction circuitry connected for supplying said packets of de-interleaved data with each one of said packets that had fewer than a prescribed number of errors having been corrected;

a data de-randomizer connected for receiving from said error-detection-and-correction circuitry said packets of de-interteaved data with each one of said packets that had fewer than a prescribed number of errors having been corrected, and for generating a data de-randomizer output signal by exclusive-ORing said de-interleaved data with a prescribed de-randomizing signal; and a packet sorter connected for supplying in each of a plurality of output signals therefrom a particular set of identifiable data packets sorted from said data de-randomizer output signal in response to a packet identification signal for each data packet therein not left in error by said error-detection-and-correction circuitry.

19. A receiver as set forth in claim 18, further comprising:

a direct-component-suppression filter connected to receive as its input signal said digitized baseband broadcast digital television signal recovered by said demodulator and analog-to-digital conversion circuitry, which input signal is accompanied by a direct component, said direct-component-suppression filter being connected to supply said auto-correlation filtering apparatus with said digitized baseband broadcast digital television signal from which accompanying direct component is suppressed.

20. A receiver for broadcast digital television signals that periodically include a repetitive pseudo-random noise sequence said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

auto-correlation filtering apparatus, connected for performing a circular convolution of a single cycle of a reference pseudo-random noise sequence with a selected single cycle of repetitive pseudo-random noise sequence from each occurrence of said repetitive pseudo-random noise sequence in said digitized baseband broadcast digital television signal from said demodulator and analog-to-digital conversion circuitry, thereby to generate a cepstrum characterizing the transmission channel to said receiver for digital television signalssaid selected single cycle being sufficiently delayed from the beginning of said repetitive pseudo-random noise sequence to be less affected by post-echoes of signal preceding said repetitive pseudo-random noise sequence, and said selected single cycle being sufficiently before the conclusion of said repetitive pseudo-random noise sequence to be less affected by pre-echoes of signal succeeding said repetitive pseudo-random noise sequence; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said cepstrum.

21. A receiver as set forth in claim 20, wherein said auto-correlation filtering apparatus of cyclic type is constructed for performing said circular convolution entirely within the time-domain.

22. A receiver as set forth in claim 20, further comprising:

a direct-component--suppression filter connected to receive as its input signal said digitized baseband broadcast digital television signal recovered by said demodulator and analog-to-digital conversion circuitry, which input signal is accompanied by a direct component, said direct-component-suppression filter being connected to supply said auto-correlation filtering apparatus with said digitized baseband broadcast digital television signal from which accompanying direct component is suppressed.

23. A receiver for broadcast digital television signals that periodically include a repetitive pseudo-random noise sequence, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

a direct-component-suppression filter connected to receive as its input signal said digitized baseband broadcast digital television signal from said demodulator and analog-to-digital conversion circuitry, said direct-component-suppression filter connected to supply a response to said digitized baseband broadcast digital television signal that suppresses any direct component thereof;

auto-correlation filtering apparatus of non-cyclical type, connected for performing a linear convolution of a single cycle of a reference pseudo-random noise sequence with each occurrence of said repetitive pseudo-random noise sequence in said response of said direct-component-suppression filter, thereby to generate a correlation result;

a comb filter connected to receive as its input signal said correlation result and to supply a comb filter response which differentially combines said correlation result with itself as delayed by the duration of one cycle of said repetitive pseudo-random noise sequence, said comb filter response including an extended cepstrum characterizing the transmission channel to said receiver for digital television signals, which extended cepstrum is generated responsive to the consecutive cycles of said repetitive pseudo-random noise sequence in each data field;

an extended-cepstrum register connected for selecting from said comb filter response the extended cepstrum generated to the consecutive cycles of said repetitive pseudo-random noise sequence in each data field, to be temporarily stored in said extended-cepstrum register; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said extended cepstrum.

24. A receiver for broadcast digital television signals that periodically include a repetitive pseudo-random noise sequence, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

gating circuitry for selectively reproducing a respective set of successive digital samples descriptive of a selected cycle of each occurrence of said repetitive pseudo-random noise sequence in the digitized baseband broadcast digital television signal recovered by said demodulator and analog-to-digital conversion circuitry;

DFT computer apparatus for computing the discrete Fourier transform of the power spectrum of said respective set of successive digital samples that said gating circuitry selectively reproduces;

circuitry for generating a discrete Fourier transform characterizing the actual transmission channel by determining the quotient of each term of said discrete Fourier transform of the power spectrum of said respective set of successive digital samples that said gating circuitry selectively reproduces, and the corresponding term of a discrete Fourier transform indicative of the response of an ideal transmission channel to the selected cycle of said repetitive pseudo-random noise sequence;

inverse-discrete-Fourier-transform circuitry for computing the inverse-Fourier transform of said discrete Fourier transform characterizing said actual transmission channel;

a direct-component-suppression filter connected to receive as its input signal said digitized baseband broadcast digital television signal from said demodulator and analog-to-digital conversion circuitry, said direct-component-suppression filter connected to supply a response to said digitized baseband broadcast digital television signal that suppresses any direct component thereof;

auto-correlation filtering apparatus of non-cyclical type, connected for performing a linear convolution of a single cycle of a reference pseudo-random noise sequence with each occurrence of said repetitive pseudo-random noise sequence in said response of said direct-component-suppression filter, thereby to generate a correlation result;

a comb filter connected to receive as its input signal said correlation result and to supply a comb filter response which differentially combines said correlation result with itself as delayed by the duration of one cycle of said repetitive pseudo-random noise sequence, said comb filter response including extended cepstrums characterizing the transmission channel to said receiver for digital television signals, one of said extended cepstrums being generated responsive to the consecutive cycles of said repetitive pseudo-random noise sequence in each data field;

an extended-cepstrum register connected for selecting from said comb filter response the extended cepstrum generated responsive to the consecutive cycles of said repetitive pseudo-random noise sequence in each data field, to be temporarily stored in said extended-cepstrum register;

a computer in which a cyclic repetition of the inverse-Fourier transform of said discrete Fourier transform characterizing said actual transmission channel is generated and is pruned in accordance with the extended cepstrum temporarily stored in said extended-cepstrum register to generate a channel impulse response without wrap-around; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said channel impulse response without wrap-around.

25. A receiver for broadcast digital television signals that periodically include a repetitive pseudo-random noise sequence, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

auto-correlation filtering apparatus of cyclical type, connected for performing a circular convolution of a single cycle of a reference pseudo-random noise sequence with a single cycle of pseudo-random noise sequence selected from each occurrence of said repetitive pseudo-random noise sequence in said digitized baseband broadcast digital television signal from said demodulator and analog-to-digital conversion circuitry, thereby to generate a cepstrum characterizing the transmission channel to said receiver for digital television signals; and a direct-component-suppression filter connected to receive as its input signal said digitized baseband broadcast digital television signal from said demodulator and analog-to-digital conversion circuitry, said direct-component-suppression filter connected to supply a response to said digitized baseband broadcast digital television signal that suppresses any direct component thereof;

auto-correlation filtering apparatus of non-cyclical type, connected for performing a linear convolution of a single cycle of a reference pseudo-random noise sequence with each occurrence of said repetitive pseudo-random noise sequence in said response of said direct-component-suppression filter, thereby to generate a correlation result;

a comb filter connected to receive as its input signal said correlation result and to supply a comb filter response which differentially combines said said correlation result with itself as delayed by the duration of one cycle of said repetitive pseudo-random noise sequence, said comb filter response including extended cepstrums characterizing the transmission channel to said receiver for digital television signals, one of said extended cepstrums being generated responsive to the consecutive cycles of said repetitive pseudo-random noise sequence in each data field;

an extended-cepstrum register connected for selecting from said comb filter response the extended cepstrum generated responsive to the consecutive cycles of said repetitive sequence in each data field, to be temporarily stored in said extended-cepstrum register;

a computer in which a cyclic repetition is generated of the cepstrum generated by said match filtering apparatus of cyclical type and is pruned in accordance with the extended cepstrum temporarily stored in said extended-cepstrum register to generate a channel impulse response without wrap-around; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said channel impulse response without wrap-around.

* * * * *